US012163480B2

(12) United States Patent
Krzeminski

(10) Patent No.: US 12,163,480 B2
(45) Date of Patent: Dec. 10, 2024

(54) ENGINE AND METHOD OF OPERATING THE SAME

(71) Applicant: Alpha-Otto Technologies Inc., Ann Arbor, MI (US)

(72) Inventor: John Krzeminski, Fenton, MI (US)

(73) Assignee: Alpha-Otto Technologies, Inc., Ann Arbor, MI (US)

( * ) Notice: Subject to any disclaimer, the term of this patent is extended or adjusted under 35 U.S.C. 154(b) by 0 days.

(21) Appl. No.: 18/234,036

(22) Filed: Aug. 15, 2023

(65) Prior Publication Data

US 2024/0052793 A1 Feb. 15, 2024

Related U.S. Application Data

(60) Provisional application No. 63/397,952, filed on Aug. 15, 2022.

(51) Int. Cl.
*F02D 13/02* (2006.01)
*F01L 7/00* (2006.01)
(Continued)

(52) U.S. Cl.
CPC ............ *F02D 13/0284* (2013.01); *F01L 7/00* (2013.01); *F02B 37/16* (2013.01);
(Continued)

(58) Field of Classification Search
CPC ............. F02D 13/0249; F02D 13/0284; F02D 41/009; F02D 2200/101; F01L 7/00; F02B 37/16; F02B 2075/025; F02M 61/145
See application file for complete search history.

(56) References Cited

U.S. PATENT DOCUMENTS 4,289,097 A 9/1981 Ward
4,321,893 A * 3/1982 Yamamoto .......... F02D 13/0284 123/65 PE
(Continued)

FOREIGN PATENT DOCUMENTS

DE 4335083 A1 4/1995
GB 729623 A 5/1955
(Continued)

OTHER PUBLICATIONS

Jackson, Rory. "Rotary Foundation", Unmanned Systems Technology: Critical Intelligence for land, Sea and Aerospace Engineers, Aug./Sep. 2020. pp. 66-75.
(Continued)

*Primary Examiner* — Audrey B. Walter
(74) *Attorney, Agent, or Firm* — COOLEY LLP

(57) ABSTRACT

An engine system and method of operation therefor are provided. The system is a two-stroke internal combustion engine having an exhaust valve assembly that controls the exhaust cycle relative to crankshaft timing. The exhaust valve assembly is positioned between exhaust port and an exhaust pipe. The exhaust valve assembly comprises a rotary exhaust valve and valve phasing assembly. The rotary exhaust valve comprises a valve body defining a valve void therethrough. The use of the rotary exhaust valve allows for alteration or calibration of the fixed time and location at which the intake port and exhaust port are opened and closed by the piston with respect to the respective engine cycle. Notably, while still uncovered by the piston, the exhaust port may be closed due to full misalignment of the valve void and the exhaust port, while the intake port remains open, allowing for cylinder charging.

20 Claims, 29 Drawing Sheets

(51) Int. Cl.

| | |
|---|---|
| ***F02B 37/16*** | (2006.01) |
| ***F02D 41/00*** | (2006.01) |
| ***F02M 61/14*** | (2006.01) |
| *F02B 75/02* | (2006.01) |

(52) U.S. Cl.

CPC ....... *F02D 13/0249* (2013.01); *F02D 41/009* (2013.01); *F02M 61/145* (2013.01); *F02B 2075/025* (2013.01); *F02D 2200/101* (2013.01)

(56) References Cited

U.S. PATENT DOCUMENTS

| | | | | | |
|---|---|---|---|---|---|
| 4,671,218 | A | | 6/1987 | Weiland | |
| 5,105,775 | A | | 4/1992 | Maissant | |
| 5,267,535 | A | * | 12/1993 | Luo | F01L 7/12 123/190.3 |
| 5,873,334 | A | | 2/1999 | Heinrich | |
| 6,182,449 | B1 | | 2/2001 | Halimi et al. | |
| 6,481,394 | B1 | | 11/2002 | Hiki | |
| 6,526,935 | B2 | | 3/2003 | Shaw | |
| 6,895,906 | B1 | | 5/2005 | Gahan | |
| 2002/0139327 | A1 | | 10/2002 | Uenoyama et al. | |
| 2002/0148428 | A1 | * | 10/2002 | Pisano | F01L 7/10 123/190.17 |
| 2011/0017170 | A1 | | 1/2011 | Song et al. | |
| 2014/0158080 | A1 | * | 6/2014 | Bayliff | F01L 5/20 123/190.2 |
| 2022/0049634 | A1 | * | 2/2022 | Vaseleniuck | F01L 7/16 |

FOREIGN PATENT DOCUMENTS

| | | | | |
|---|---|---|---|---|
| JP | 2020204297 | A | * | 12/2020 |
| WO | WO-2024039644 | A2 | | 2/2024 |

OTHER PUBLICATIONS

International Search Report and Written Opinion for Application No. PCT/US2023/030226, dated Mar. 25, 2024, 15 pages.

Invitation to Pay Fees for Application No. PCT/US2023/030226, dated Dec. 21, 2023, 2 pages.

* cited by examiner

ENGINE AND METHOD OF OPERATING THE SAME

CROSS REFERENCE TO RELATED APPLICATIONS

This application claims the benefit of U.S. Provisional Application No. 63/397,952, filed Aug. 15, 2022, which is hereby incorporated by reference in its entirety.

TECHNICAL FIELD

The present disclosure generally relates to an internal combustion engine and a method of operating the same. More particularly, a two-stroke internal combustion engine having an exhaust valve that controls the exhaust cycle relative to crankshaft timing via a process embodied in at least one engine control strategy for the same.

BACKGROUND

A traditional two-stroke internal combustion engine is advantageous in that it generally maintains an improved power density, i.e., the power output of the engine compared to the weight and size of the engine system itself, to other traditional architectures such as four-stroke internal combustion engines. However, traditional two-stroke engines generally use more fuel than other engine architectures and habitually have reduced emissions ratings due to the potential for release of unburned fuel, oil, and hydrocarbons into the atmosphere.

Two-stroke internal combustion engines generally have a fixed placement intake port and a fixed placement exhaust port formed in the sidewalls of a cylinder sleeve. The intake port feeds an air and fuel mixture to the cylinder for combustion. The exhaust port opens to an exhaust passage system wherein the engine exhaust gases are released. Among its several functions, the reciprocation of the piston within the cylinder sleeve and across each port cyclically seals and opens each of the intake port and the exhaust port to maintain pressure balance in and facilitate the proper movement of gases through the engine. More particularly, during the compression stroke of the piston, air is pumped into the engine cylinder utilizing the underside of the piston, and as such, the amount of air pumped into the engine is inherently limited by the predefined physical geometry of the engine. During the exhaust stroke, air inside the crankcase is compressed and channeled through a transfer port and forced into the combustion chamber. Following combustion, exhaust gas is channeled out of the engine via the exhaust port.

Since the intake port and exhaust port remain in fixed locations within the cylinder, the exhaust port and intake port are opened and closed by the piston at a fixed time and location with respect to the respective engine cycle. In many traditional two-stroke engines, the intake port and exhaust port are positioned opposite one another within the cylinder sleeve, and as such there exists a potential direct path between the intake port and the exhaust port, when both ports are open, because the opening of such ports is directly controlled by the piston and its location within the cylinder sleeve.

Due to the nature of a piston ported two-stroke internal combustion engine, the exhaust port will traditionally open first and therefore close last in the cycle. After ignition occurs and high-pressure combusted gas forces the piston downward during the power stroke, the exhaust port must open before the intake port is closed to avoid high-pressure exhaust gas flowing backward through the intake port into the intake system. When the exhaust port opens before the intake port is fully closed, there is potential for the incoming intake fuel and fresh air to flow directly out of the exhaust port, without going through the combustion process. Expulsion of the incoming intake fuel and fresh air directly out of the exhaust port is not only lost work, e.g., air pumped into the engine and out of the engine without any gained benefit, but also results in a reduced emissions rating, i.e., increased hydrocarbon emissions being disposed into the atmosphere by the subject engine.

For at least these reasons, there is a need for a two-stroke internal combustion engine having high power density, thermal efficiency, and durability that utilizes less fuel and while reducing unwanted hydrocarbon emission outputs in the relevant industry.

SUMMARY

The present disclosure is directed to an internal combustion engine system and a method of operating the same. More particularly, a two-stroke internal combustion engine having an exhaust valve that controls the exhaust cycle relative to crankshaft timing via a process embodied in at least one engine control strategy for the same.

As such, the internal combustion engine system of the present disclosure mirrors that of the traditional two-stroke internal combustion engine architecture in that it includes a fixed placement intake port and a fixed placement exhaust port defined by the cylinder sidewall, such that the intake port feeds an air and fuel mixture to the cylinder bore for combustion, and the exhaust port opens to an exhaust gas pipe wherein the engine exhaust gases are released. The intake port and exhaust port are positioned opposite one another on the cylinder sidewall, with the exhaust port being positioned longitudinally upward of the intake port along a cylinder bore axis.

Among its several functions, the reciprocation of the piston in the cylinder bore across each port cyclically seals and opens each of the intake port and the exhaust port. Since the intake port and exhaust port remain in fixed locations within the cylinder sidewall, the exhaust port and intake ports are opened and closed by the piston at a fixed time and location with respect to the respective engine cycle.

However, the present disclosure further includes an exhaust valve assembly positioned between the exhaust port and the exhaust gas pipe. This exhaust valve assembly allows for control of outgoing exhaust gas and phased timing of the engine cycle for opening and closing the exhaust port and intake port respectively. The timing of the opening and closing of the intake port and exhaust ports directly affects the horsepower, fuel efficiency, thermal efficiency, and emissions toxicity of the engine system.

In one example embodiment, the exhaust valve assembly comprises a rotary exhaust valve and valve phasing assembly. The rotary exhaust valve comprises a valve body defining a valve void therethrough. The rotary exhaust valve body is disposed on a valve axis and rotates about the valve axis in a predetermined direction.

The presence of the rotary exhaust valve allows for alterations to the fixed time and piston location at which the exhaust port is opened and closed (opened and sealed by the piston) with respect to the respective engine cycle. Notably, while still uncovered by the piston, the exhaust port may be closed due to full misalignment of the valve void and the exhaust port. As such, when the valve void is fully misaligned with the exhaust port, exhaust gas is not able to flow out of the exhaust port, eliminating the potential for incoming intake fuel and fresh air to flow directly out of the exhaust port, without going through the combustion process. In this way, the engine system of the present disclosure operates via a six-stage process embodied in at least one engine control strategy.

In one control scheme, namely the power cycle control scheme wherein the objective of the phased timing of the engine cycle is designed to achieve increased power output or power density of the engine, when the intake port remains open, additional incoming air is still allowed to enter the cylinder bore via the intake port, after the exhaust port is closed due to the misalignment between the valve void and with the exhaust port. As such, the additional density of air supplied to the engine, while the exhaust port is closed via misalignment between the valve void and the exhaust port, allows the pressure within the cylinder bore to be increased above atmospheric pressure, effectively supercharging the engine.

In another control scheme, namely the over-expansion cycle control scheme, wherein the objective of the phased timing of the engine cycle is designed to achieve increased thermal efficiency of the engine, the exhaust valve is phased to force an asymmetry in exhaust timing, i.e., the exhaust port is fully opened (valve void fully aligned with the exhaust port) as late as possible in the cycle. In this way, the exhaust port and intake port remain open at the same time for a duration of a lengthened expansion stroke of the piston. Said another way, the compression stroke of the piston is much shorter than the power or expansion stroke of the piston when the engine system is operating in the over-expansion cycle control scheme, and as such cool air from the intake port may mix with warm post combustion air, not yet expelled from the exhaust port, creating greater thermal efficiency in the engine system, i.e., reducing the work required for combustion.

BRIEF DESCRIPTION OF THE DRAWINGS

The embodiments set forth in the drawings are illustrative and exemplary in nature and not intended to limit the subject matter. The following detailed description of the illustrative embodiments can be understood when read in conjunction with the following drawings, where like structure is indicated with like reference numerals and in which.

DETAILED DESCRIPTION

Figure 1:
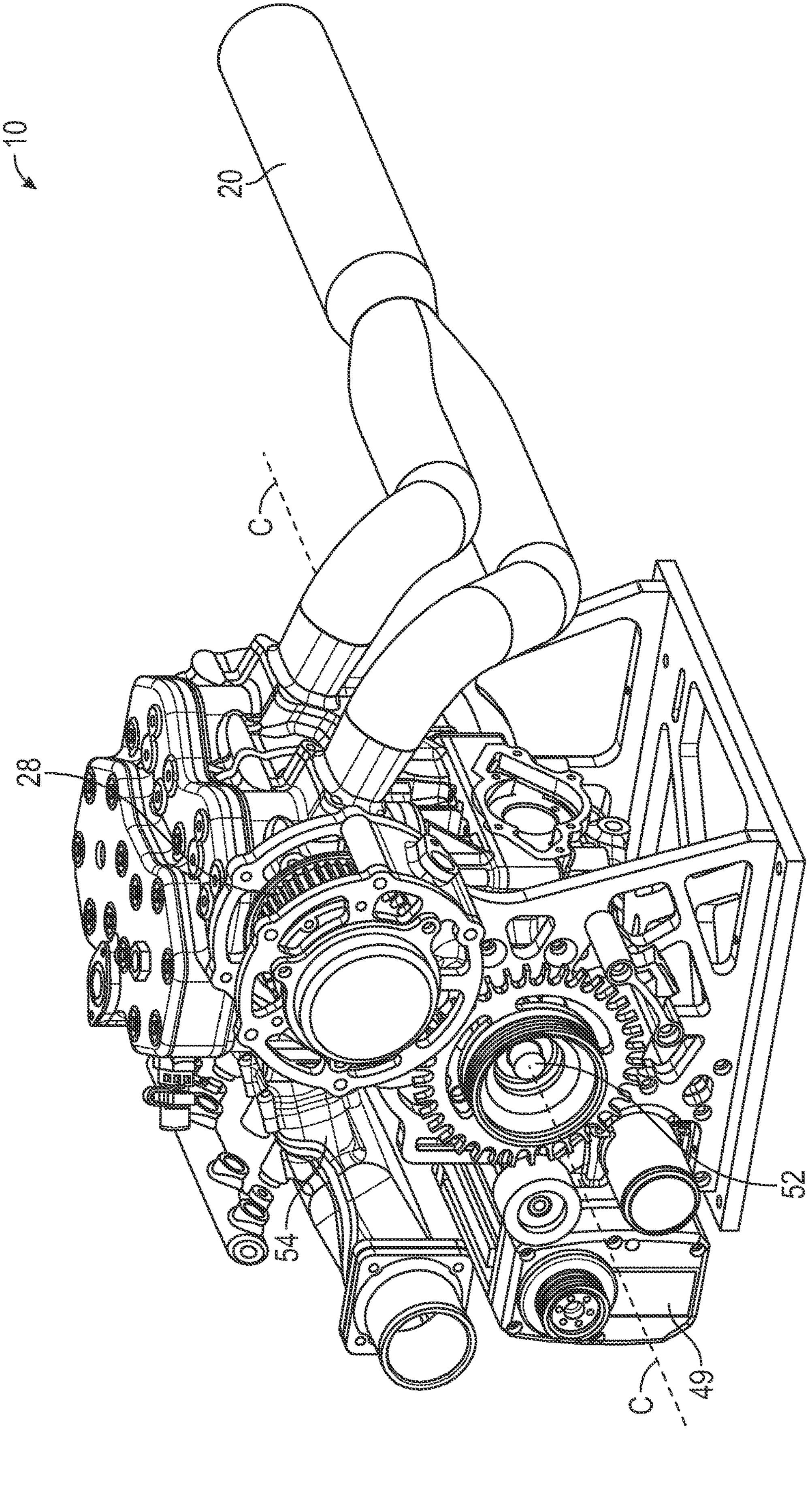
FIG. 1 is a schematic front perspective view of an example engine architecture of the present disclosure.
Figure 2:
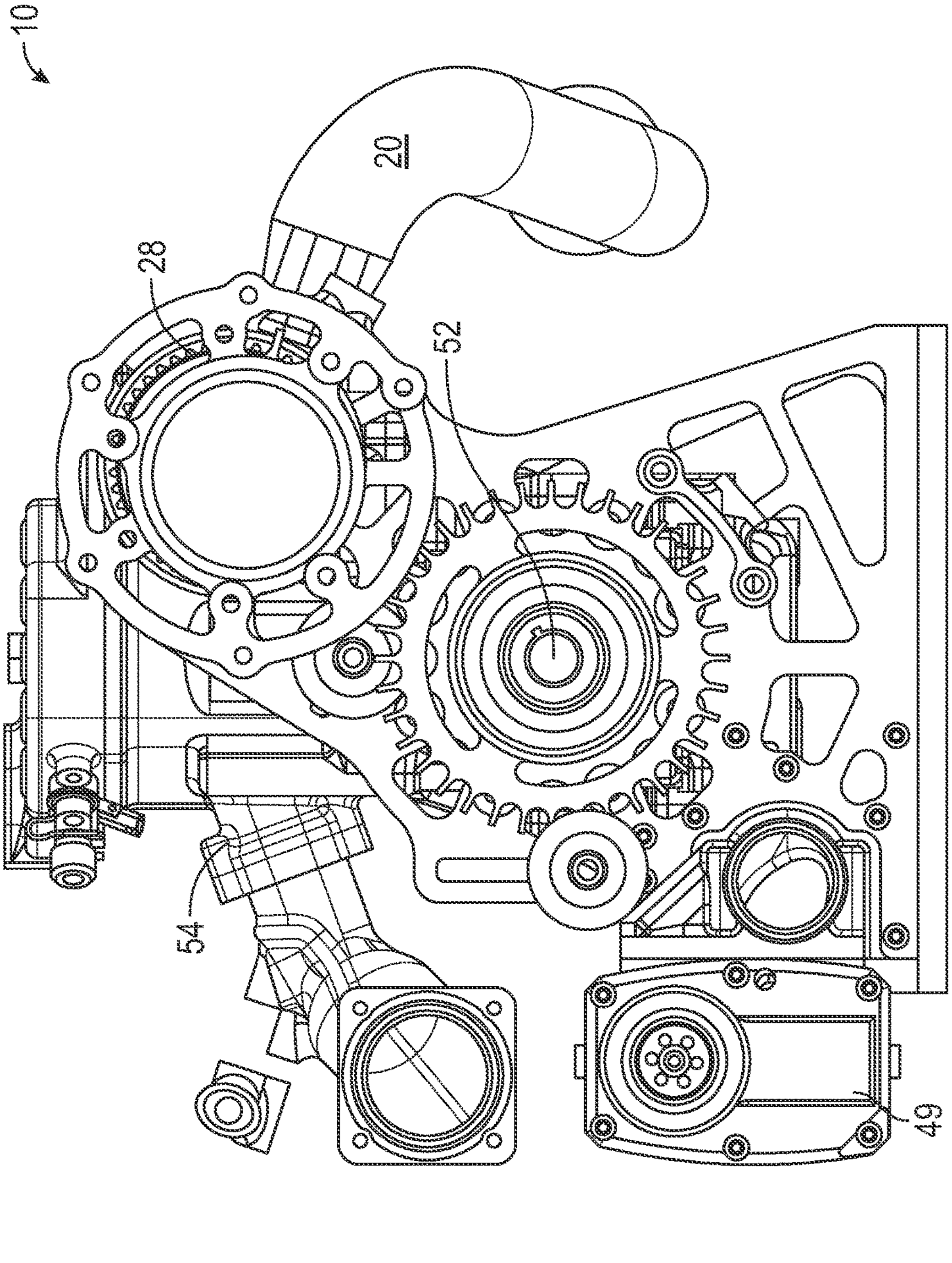
FIG. 2 is a schematic front elevation view of the example engine architecture of the present disclosure.
Figure 3:
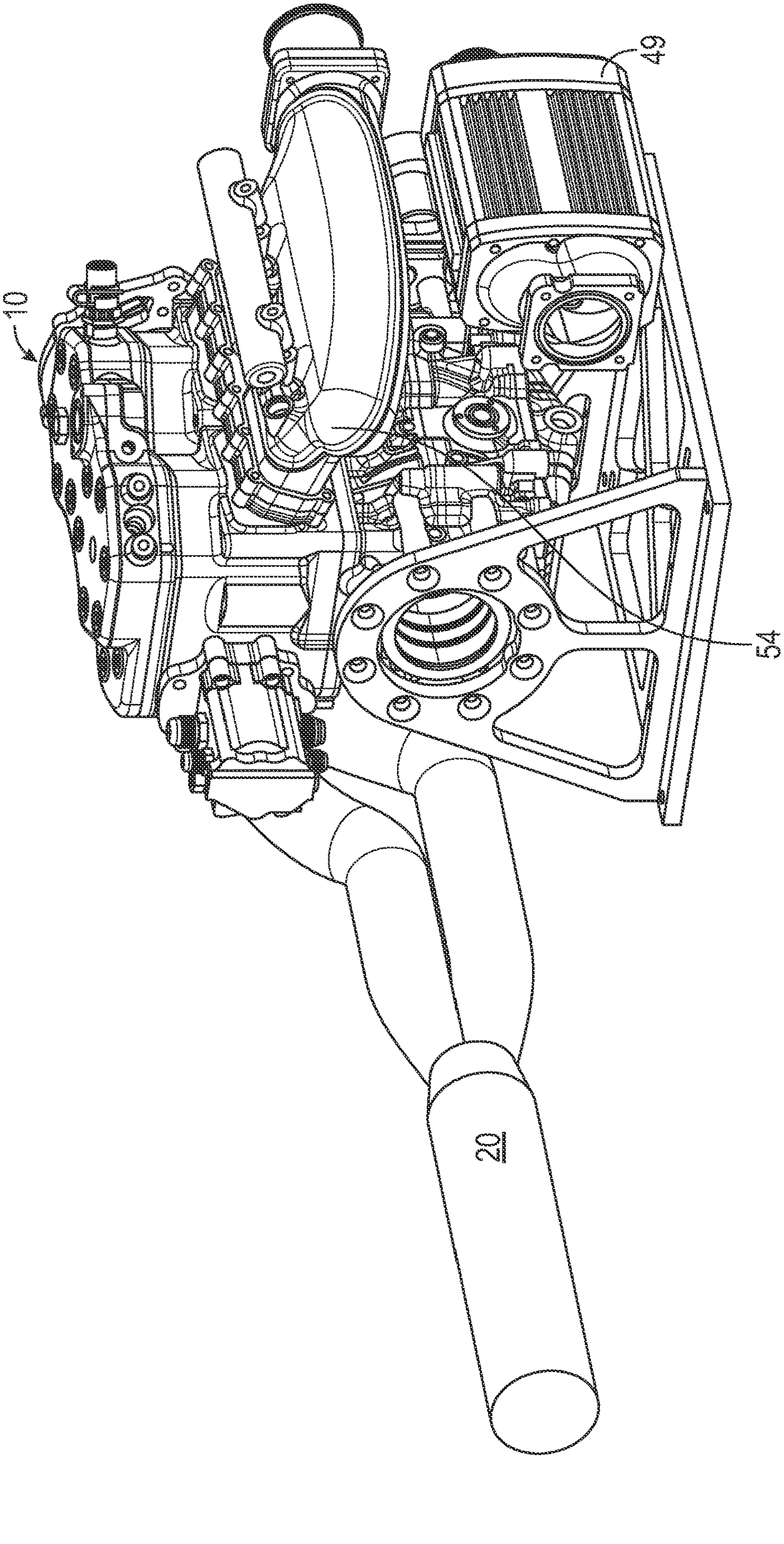
FIG. 3 is a schematic rear perspective view of the example engine architecture of the present disclosure.
Figure 4:
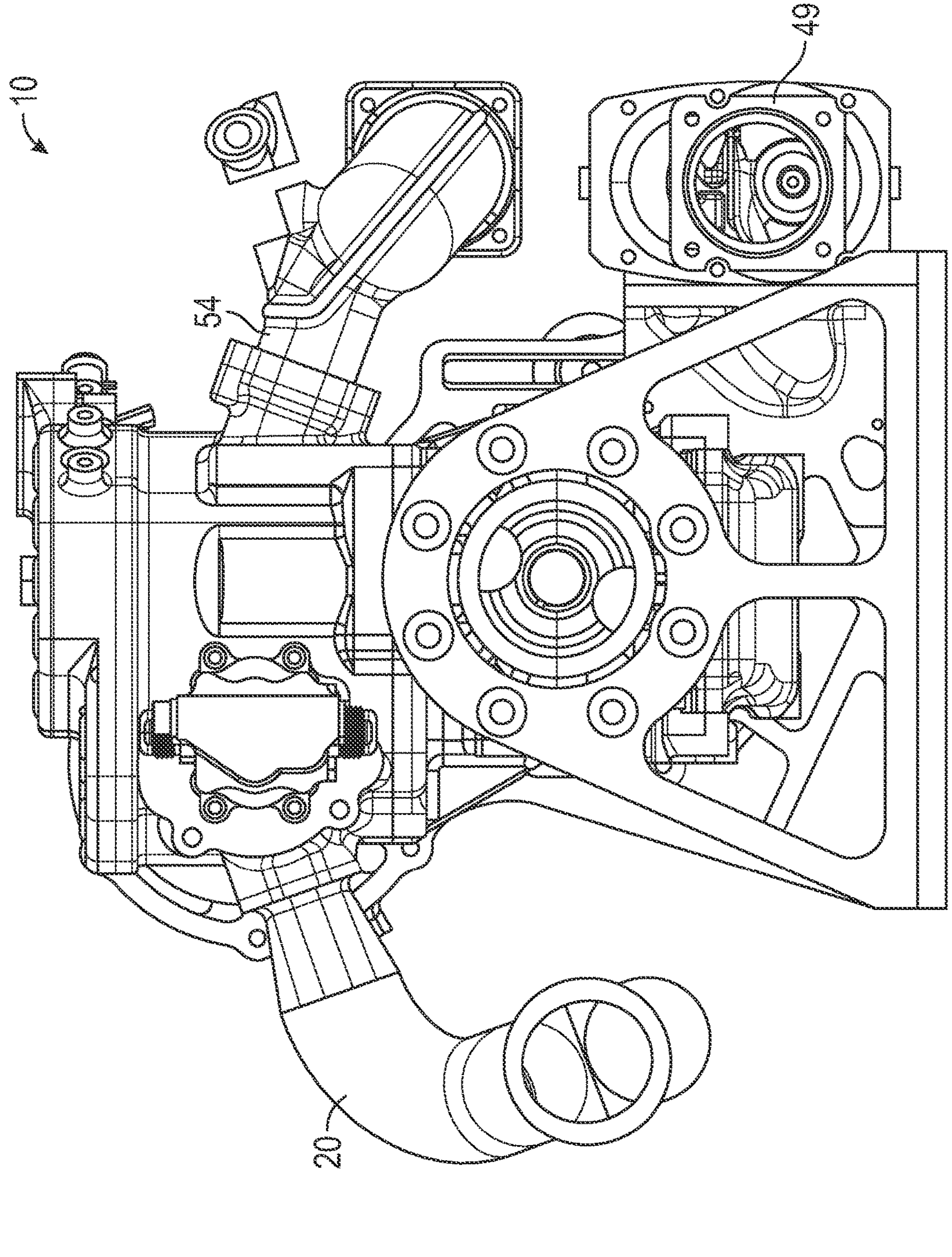
FIG. 4 is a schematic rear elevation view of the example engine architecture of the present disclosure.
Figure 5:
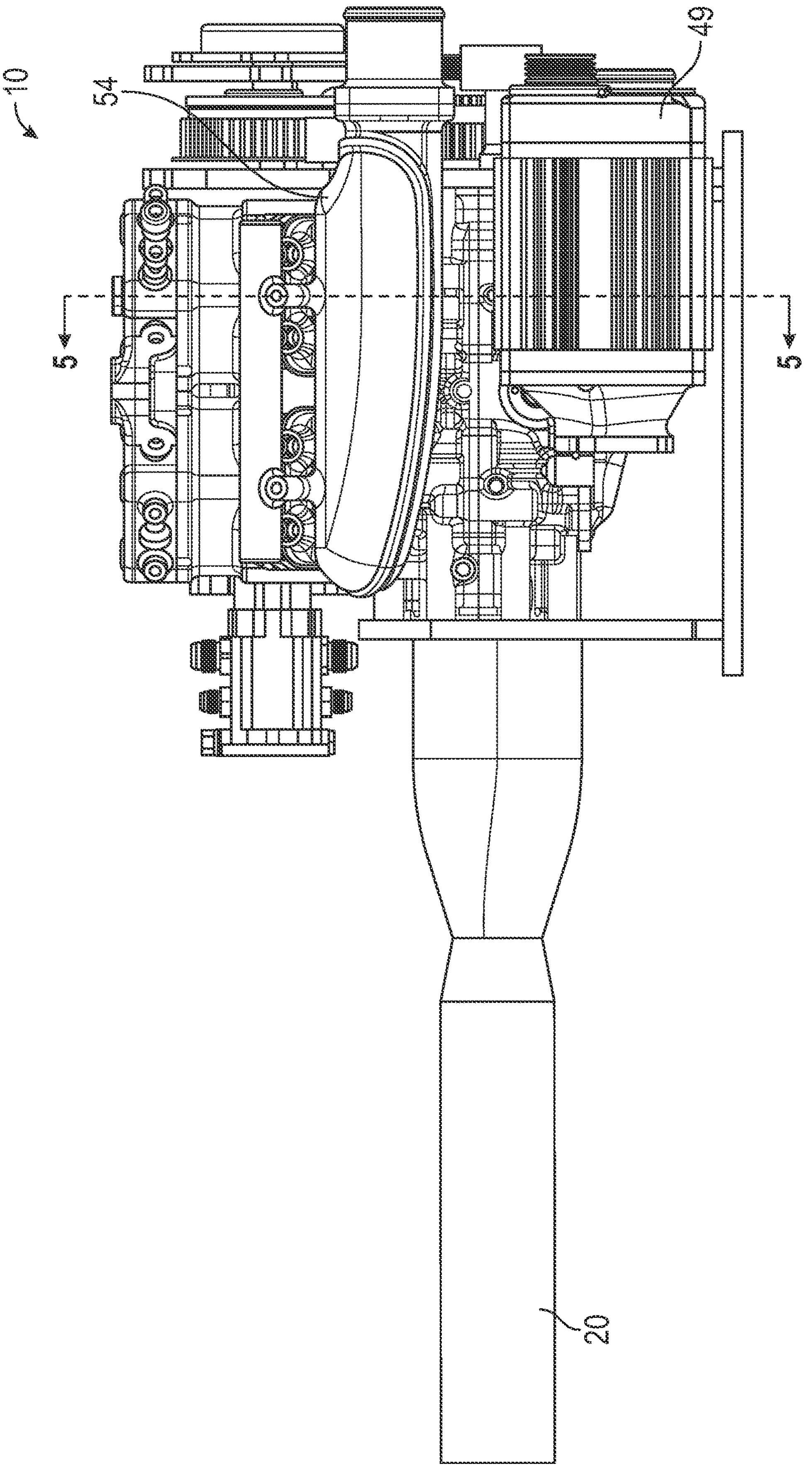
FIG. 5 is a schematic side elevation view of the example engine architecture of the present disclosure.

While the present disclosure may be described with respect to specific applications or industries, those skilled in the art will recognize the broader applicability of the disclosure.

The terms "a", "an", "the", "at least one", and "one or more" are used interchangeably to indicate that at least one of the items is present. A plurality of such items may be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, a disclosure of a range is to be understood as specifically disclosing all values and further divided ranges within the range.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. The term "any of" is understood to include any possible combination of referenced claims of the appended claims, including "any one of" the referenced claims.

Features shown in one figure may be combined with, substituted for, or modified by, features shown in any of the figures. Unless stated otherwise, no features, elements, or limitations are mutually exclusive of any other features, elements, or limitations. Furthermore, no features, elements, or limitations are absolutely required for operation. Any specific configurations shown in the figures are illustrative only and the specific configurations shown are not limiting of the claims or the description.

For consistency and convenience, directional adjectives are employed throughout this detailed description corresponding to the illustrated embodiments. Those having ordinary skill in the art will recognize that terms such as "above", "below", "upward", "downward", "top", "bottom", etc., may be used descriptively relative to the figures, without representing limitations on the scope of the invention, as defined by the claims. Any numerical designations, such as "first" or "second" are illustrative only and are not intended to limit the scope of the disclosure in any way.

The term "longitudinal", as used throughout this detailed description and in the claims, refers to a direction extending a length of a component. In some cases, a component may be identified with a longitudinal axis as well as a forward and rearward longitudinal direction along that axis. The longitudinal direction or axis may also be referred to as an anterior-posterior direction or axis.

The term "transverse", as used throughout this detailed description and in the claims, refers to a direction extending a width of a component. The transverse direction or axis may also be referred to as a lateral direction or axis or a mediolateral direction or axis.

The term "vertical", as used throughout this detailed description and in the claims, refers to a direction generally perpendicular to both the lateral and longitudinal directions. The term "upward" or "upwards" refers to the vertical direction pointing towards a top of the component. The term "downward" or "downwards" refers to the vertical direction pointing opposite the upwards direction, toward the bottom of a component. In addition, the term "proximal" refers to a direction that is nearer and the term "distal" refers to a relative position that is further away. Thus, the terms proximal and distal may be understood to provide generally opposing terms to describe relative spatial positions.

In a general sense, the present disclosure provides an internal combustion engine system 10 that mirrors that of the traditional two-stroke internal combustion engine architecture in that it includes a fixed placement intake port 14 and a fixed placement exhaust port 16 defined by the cylinder sidewall 12, such that the intake port 14 feeds an air and fuel mixture to the cylinder bore 18 for combustion, and the exhaust port 16 opens to an exhaust gas pipe 20 wherein the engine exhaust gases are released. Among its several functions, the reciprocation of the piston 22 in the cylinder bore 18 across each port cyclically seals and opens each of the intake port 14 and the exhaust port 16. Since the intake port 14 and exhaust port 16 remain in fixed locations within the cylinder sidewall 12, the exhaust port 14 and intake ports 16 are opened and closed, by the piston 22, at a fixed time and location with respect to the respective engine cycle.

Fundamentally, however, incoming fresh air and fuel and outgoing exhaust gas need to be controlled in some manner in the system 10, and, therefore, the timing of the engine cycle for opening and closing the exhaust port 16 and intake port 14, respectively, directly affects the engine operation, including its horsepower, fuel efficiency, thermal efficiency, and emissions toxicity. As such, the present system 10 further includes an exhaust valve assembly 24 positioned in a stub port 50 between exhaust port 16 and the exhaust pipe 20. This exhaust valve assembly 24 further includes a rotary exhaust valve 26, which allows for control of outgoing exhaust gas, and phased timing of the opening and closing the exhaust port 16. Additionally, the timing and speed of the rotary exhaust valve 26 may be varied relative to crankshaft timing at various engine speeds and loads, by a valve phasing assembly 28.

The use of the rotary exhaust valve 26 allows for alterations to the fixed time and location at which the intake port 14 and exhaust port 16 are opened and closed by the piston 22 with respect to the respective engine cycle. Notably, while still uncovered by the piston 22, the exhaust port 16 may be closed due to an intentional full misalignment of the rotary exhaust valve 26 and the exhaust port 16, while the intake port 14 remains open. With the rotary exhaust valve 26 fully misaligned with the exhaust port 16, exhaust gas is not able to flow out of the exhaust port 16 to the exhaust pipe 20, reducing the potential for incoming intake fuel and fresh air to flow directly out of the exhaust port 16, without going through the combustion process. Moreover, additional incoming air is still allowed to enter the cylinder bore 18 via the intake port 14, after the exhaust port 16 is closed due to the misalignment between the rotary exhaust valve 26 and the exhaust port 16.

As such, in one control strategy designed to achieve increased power output or power density of the engine 10, the additional density of air supplied to the engine 10, while the exhaust port 16 is closed via misalignment between the rotary exhaust valve 26 and the exhaust port 16, allows the pressure P2 within the cylinder bore 18 to be increased above atmospheric pressure, effectively supercharging the engine 10.

In another control scheme, designed to achieve increased thermal efficiency of the engine 10, the rotary exhaust valve 26 is phased to force an asymmetry in exhaust timing, i.e., the exhaust port 16 is fully opened (valve 26 fully aligned with the exhaust port 16) as late as possible in the cycle. In this way, the exhaust port 16 and intake port 14 remain open at the same time for a duration of a lengthened expansion stroke of the piston 22, such that cool air from the intake port 14 may mix with warm post combustion air, not yet expelled from the exhaust port 16, creating greater thermal efficiency in the engine system, i.e., reducing the work required for combustion.

Figure 6:
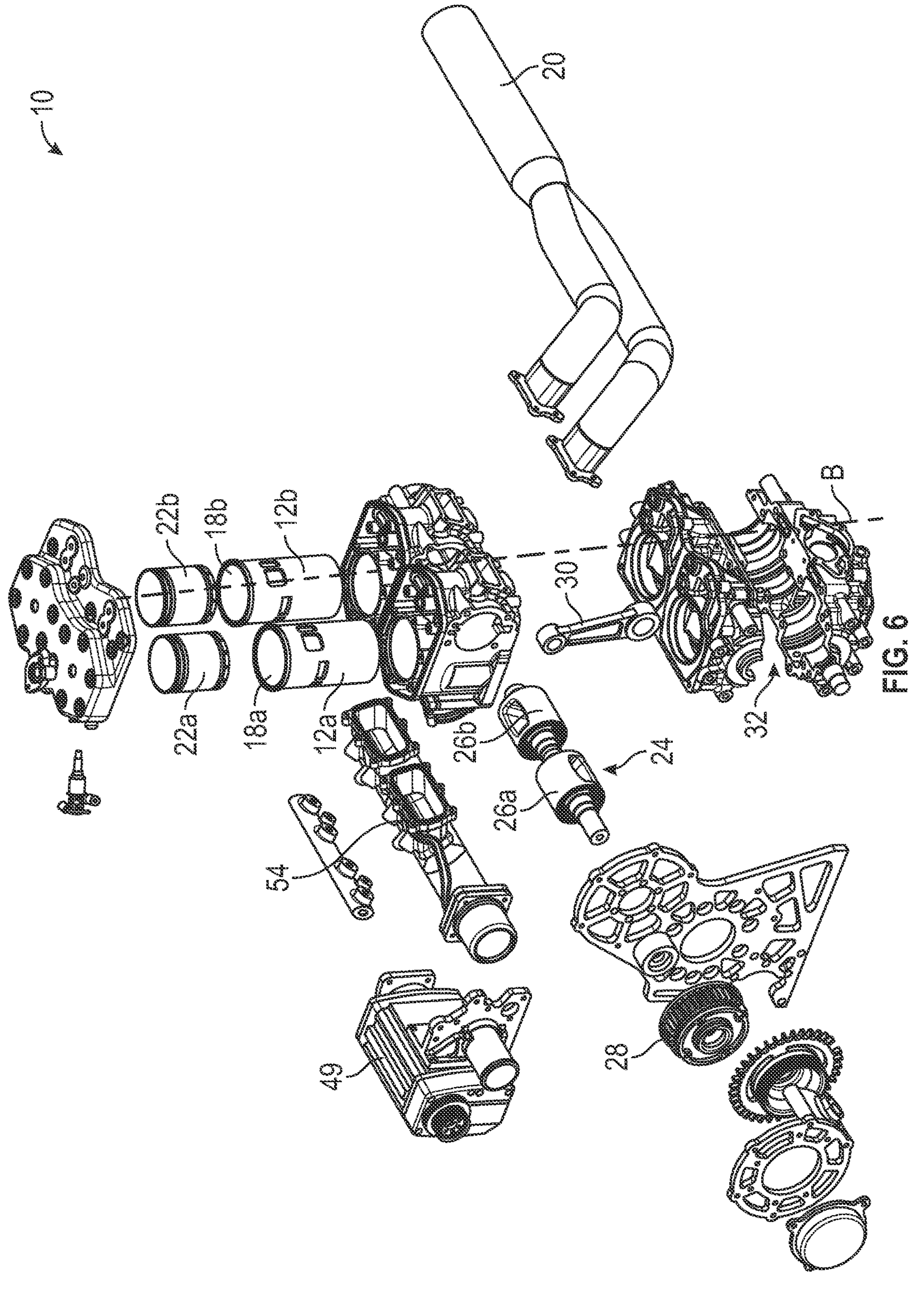
FIG. 6 is a schematic exploded view of the example engine architecture of the present disclosure.

Referring to the Figures, as shown in FIGS. 1-6 with particular reference for FIG. 6, an engine system 10 is provided. The engine system 10 comprises an engine crankshaft 52 disposed on a crankshaft axis C. The crankshaft 52 is rotatable about the crankshaft axis C in a predetermined direction. The crankshaft 52 may be housed in a crankcase 32.

The system 10 may further comprise at least one cylinder having a cylinder sidewall 12. The cylinder sidewall 12 may be composed of a metallic material and may be further coated with a heat resistant coating such as a ceramic coating or another heat resistant coating known in the relevant art. The cylinder sidewall 12 defines a cylinder bore 18 therein, with the cylinder bore 18 is disposed on a bore axis B. The cylinder sidewall 12 further defines an intake port 14 and an exhaust port 16 therein, as well as a plurality of scavenging ports (shown in FIG. 6). The intake port 14 is disposed in and defined by the cylinder sidewall 12 and the exhaust port 16 is positioned opposite the intake port 14 and likewise disposed in and defined by the cylinder sidewall 12 with respect to the bore axis B. Said another way, the intake port 14 is disposed laterally opposite the exhaust port 16 on the cylinder sidewall 12. Moreover, the exhaust port 16 may be disposed vertically upward of the intake port 14 with respect to the bore axis B.

Figure 9A:
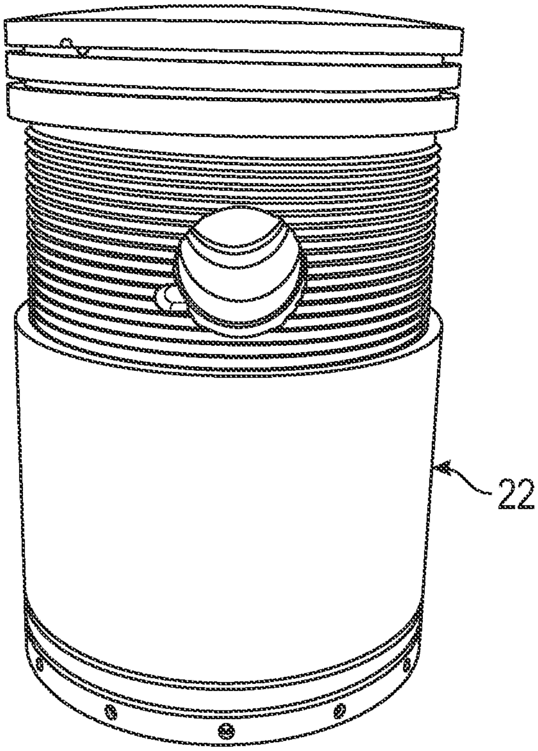
FIG. 9A is a schematic partially exploded view of an example piston of the example engine architecture of the present disclosure.
Figure 9B:
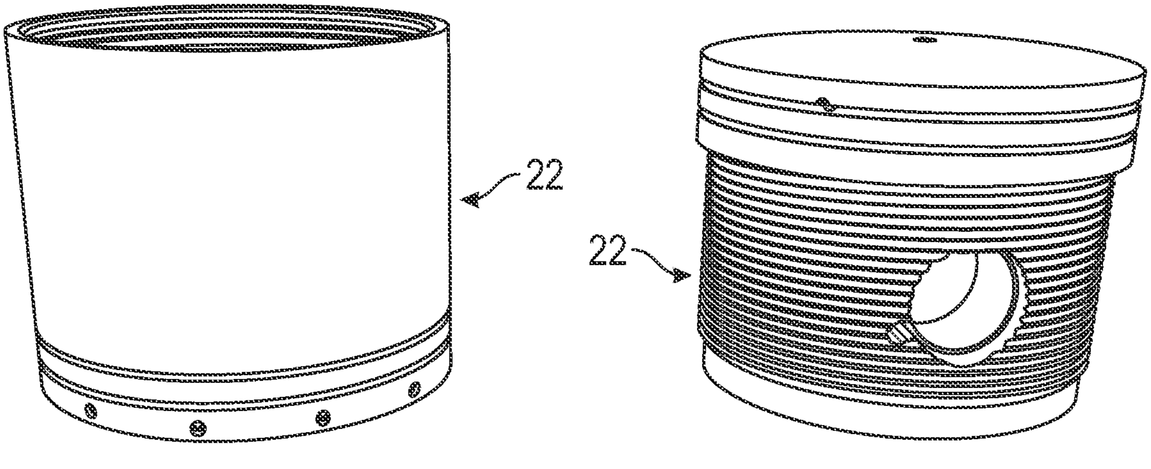
FIG. 9B is a schematic exploded view of an example piston of the example engine architecture of the present disclosure.

The system 10 further comprises a piston assembly operatively connected to the engine crankshaft 32. The piston assembly comprises a piston 22 (shown in further detail in FIGS. 9A-9B) and a connector arm or linkage 30, wherein the connector arm 30 operatively couples the piston 22 to the crankshaft 32. As shown in FIGS. 9A-9B, the piston may be a traditional one-piece piston or the piston 22 of the present disclosure may be a multi-piece part. The piston 22 is disposed within the cylinder bore 18 and moveable upward and downward therein along the bore axis B. The piston 22 is further operable to cyclically seal and open the intake port 14 and the exhaust port 16 as the piston 22 moves along the bore axis B.

Given that the exhaust port 16 is disposed vertically upward of the intake port 14 with respect to the bore axis B, as the piston 22 moves downward on the bore axis B, the piston 22 will uncover the exhaust port 16 before it uncovers the intake port 14, and as the piston 22 moves upward on the bore axis B, the piston 22 will cover or close the intake port 14 before it covers or closes the exhaust port 16. Said another way, due to the fixed placement of the intake port 14 and the exhaust port 16 in the cylinder sidewall 12, absent further structure in the system 10 like the exhaust valve assembly 24 detailed herein below, the exhaust port 16 would always open first and therefore close last in the engine cycle, as in a traditional two-stroke engine architecture.

Referring still to FIGS. 1-6, the system 10 may further include an intake manifold 54 configured to deliver air to the cylinder bore 18 via the intake port 14. Additionally, at least one fuel injector 80 may be disposed along the intake manifold 54 directly adjacent to the intake port 14 (for port injection) or at the top of the cylinder 12 in the combustion chamber (for direct injection) as shown in FIG. 14G. The at least one fuel injector 80 injects fuel into the cylinder bore 18 at an injection angle of from about 12 degrees to about 18 degrees. In the preferred embodiment, the at least one fuel injector 80 injects fuel into the cylinder bore 18 at an injection angle of about 15 degrees, which may assist in combating the flow of air and fuel exiting the exhaust port 16 prior to combustion.

The system 10 may still further include an air pump 49, such as a supercharger, an exhaust driven turbo charger, or the like, configured to pump or force air into the cylinder bore 18 by compressing the air delivered to the cylinder bore 18 via the intake manifold 54, to above atmospheric pressure, thereby increasing the power density and efficiency of the system 10. In a traditional two-stroke engine architecture, the amount of air pumped into the engine 10 is limited by the predefined physical geometry of the engine, as the pumping work is done by the underside of the piston 22 during the compression stroke thereof. In the present disclosure, the piston 22 does not, in fact, act as a pump bringing air into the system 10, but simply a valve opening and sealing the respective intake port 14 and exhaust port 16 as the piston 22 moves along the bore axis B; the supercharger 49 completes the pumping work. In this way, the supercharger 49 may be managed or otherwise controlled to pump more or less air into the cylinder bore 18 depending on engine speed and engine load. For example, air pump 49, e.g., a supercharger, exhaust driven turbocharger, or the like, may be managed by an Engine Control Unit 56 via an electrical motor or managed by a mechanical system operatively connected to the crankshaft 52.

The intake manifold 54 is positioned between the supercharger 49 and the intake port 14. A bypass valve 60 (FIG. 10) may also be positioned along the intake manifold 54 between the supercharger 49 and the intake port 14. Using such a bypass valve 60, allows the system to control or meter the pressurized air that is pumped into the system 10 by the supercharger 49. However, in some embodiments, given that the supercharger 49 completes the pumping work in the present architecture, such a bypass valve 60 may not be present. Rather, the Engine Control Unit 56 may dynamically manage the amount of air pumped into the cylinder bore 18 by the supercharger 49 by adjusting or managing the speed (RPM) at which the supercharger 49 is spinning and thereby controlling the mass of air that is pushed or pumped into the system 10.

While the supercharger 49 is operable to actively enhance the power density and efficiency of the system 10, absent further structure in the system 10 to control the exhaust port 16, the system geometry of a traditional two-stroke engine will defeat the purpose of the supercharger 49, such that the system 10 may actually lose power with the addition of a supercharger 49. More particularly, in traditional two-stroke architectures, the exhaust port 16 will always open first and therefore close last in the engine cycle, such that the intake port 14 is only open when the exhaust port 16 is also open. As such, the pressure P2 within the cylinder bore 18 can never be increased, even via supercharging, to a pressure value substantially above atmospheric pressure, i.e., more than about 0.50 pounds of force per square inch (PSI). As such, the additional pumping and increased mass of air delivered to the cylinder bore 18 by the supercharger 49 would simply bleed off or flow directly out of the exhaust port 16.

To solve this inherent issue found in the traditional two-stroke engine architecture, the present disclosure proposes suitable additional structure in the system 10 to control the exhaust port 16, such that supercharging, in cycles of increased power demand, is not only possible but highly beneficial to the power density and efficiency of the engine system 10. Such additional structure may also be utilized, in cycles of increased thermal efficiency demand, to create an asymmetry in exhaust timing, e.g., shortening the compression strike and lengthening the expansion stroke of the piston, i.e., reducing the work required for combustion.

Figure 7:
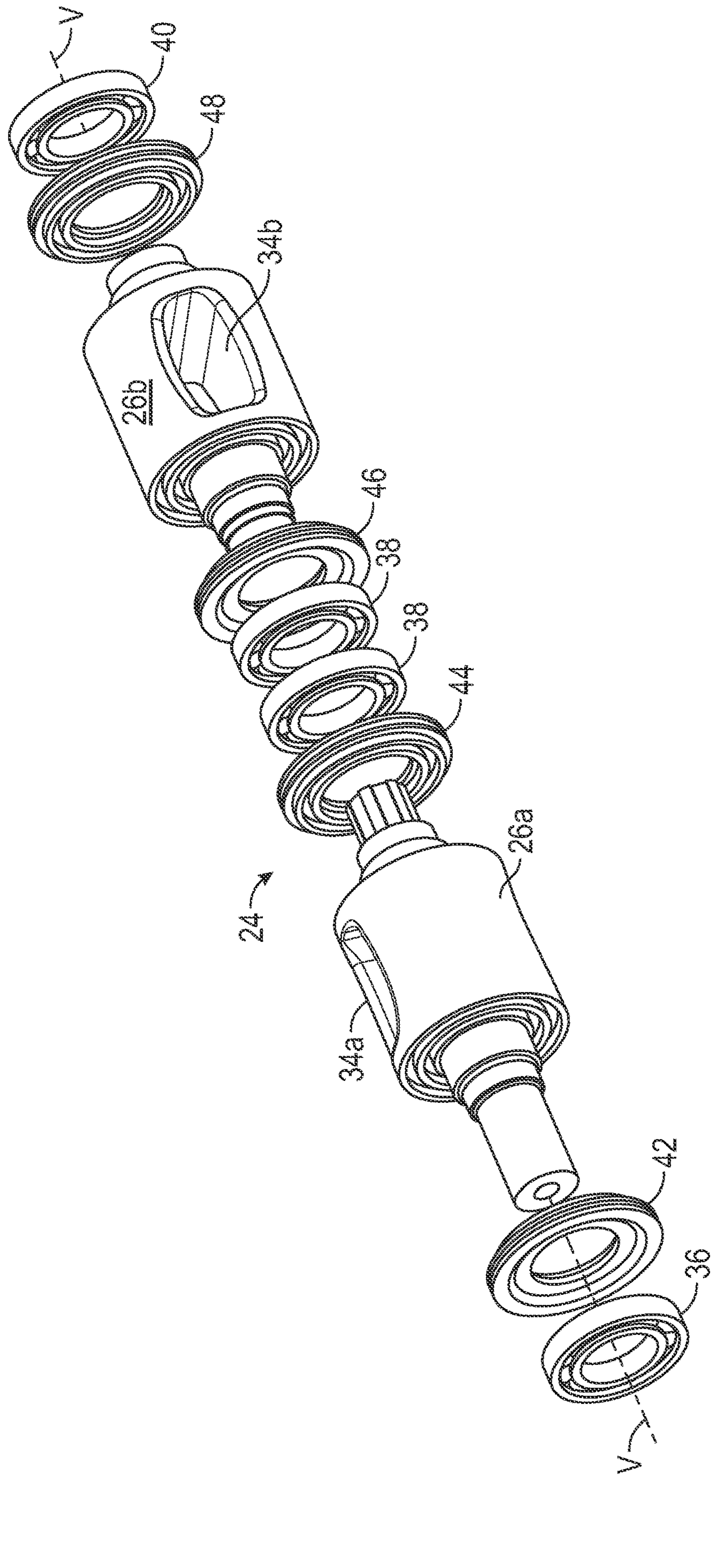
FIG. 7 is a schematic exploded view of the rotary exhaust valve(s) of the example engine architecture of the present disclosure.
Figure 8:
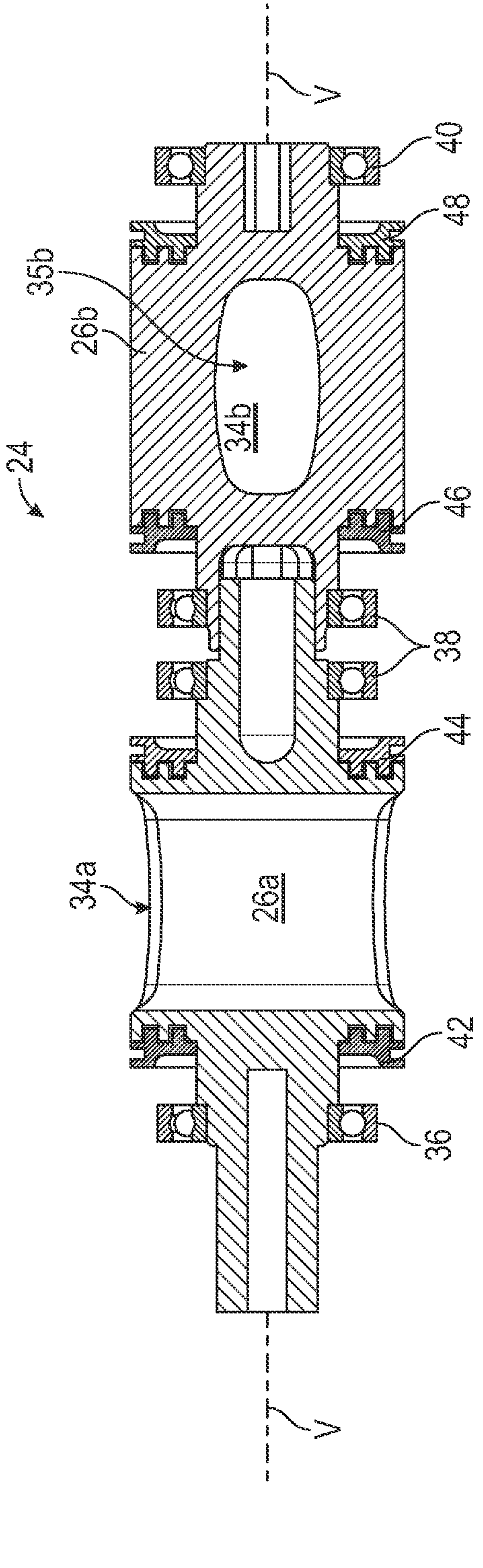
FIG. 8 is a schematic, cross-sectional view of the rotary exhaust valve(s) of the example engine architecture of the present disclosure.

Referring now to FIGS. 1-8, with particular reference to FIGS. 6-8, the engine system 10 further comprises an exhaust assembly. The exhaust assembly comprises at least one exhaust pipe 20, a stub port 50 (FIGS. 14A-14J; 16A-16J), and an exhaust valve assembly 24. The exhaust gas pipe 20 is configured to receive, via the exhaust port 16, and release engine exhaust gases formed during combustion. The stub port 50 is disposed between the exhaust port 16 and the exhaust gas valve assembly 24 and is further in fluid communication with the exhaust gas port 16.

The exhaust valve assembly 24 is disposed between the stub port 50 and the exhaust gas pipe 20 and is configured to selectively close the exhaust gas port 16 irrespective of a position of the piston 22 along the bore axis B. In one embodiment, the exhaust valve assembly 24 comprises a rotary exhaust valve 26, a valve phasing assembly 28 operatively coupled to the rotary exhaust valve 26, a plurality of seal rings 42, 44, and a plurality of bearings 36, 38. The rotary exhaust valve 26 has a valve body, which defines a valve void 34 therethrough. The valve void 34 may have a void center 35, a void length, and void width. While the dimensions of the valve void 34 may be customized for particular engine architectures, the valve 26 remains symmetrical in each such embodiment.

The rotary exhaust valve 26 may be positioned in a chamber between the stub port 50 and the exhaust pipe 20. The rotary exhaust valve 26 may be formed via a machining process. The rotary exhaust valve 26 may be composed of a metallic material, such as stainless steel or titanium, which is fairly resistant to wear or degradation due to heat cycling. Alternatively, the rotary exhaust valve 26 may be composed of a lighter metallic material by weight, such as aluminum, and coated with a heat resistant coating, such as a ceramic coating or other heat resistant coating known in the relevant art.

As shown in FIG. 7, the rotary exhaust valve 26 may be supported on a first plurality of bearings 36 on one side and a second plurality of bearings 38 on an opposite side. The bearings 36, 38 are shaped in such a way as to align with the exhaust port 16 and interface with additional apertures formed in the cylinder sidewall 12.

The rotary exhaust valve 26 further comprises a first plurality of seal rings 42 and a second plurality of seal rings 44. These seal rings 42, 44 serve multiple functions, for example, substantially sealing the exhaust port 16, and preventing exhaust gases from entering the engine chamber that houses the support bearings 36, 38 disposed on either side of the valve assembly 24. Another example advantage of the seal rings 42, 44 includes preventing oil that is used to lubricate and cool the valve assembly 24 from entering the exhaust system 20.

The usage of oil to cool the valve 26 is another aspect of the present invention. Accordingly, in one embodiment, oil will come into direct contact with the rotary exhaust valve 26 on the inboard side of the seals 36, 38. The oil will serve to lubricate the bearing system 36, 38, plain, roller, ball, or the like, as well as remove heat from the valve 26. As such, oil is pumped into the chamber housing the bearings 36, 38 and drained back to the system where the oil will be cooled and returned for reuse. As such, the oil does not reach a predetermined threshold temperature, as water jackets are provided that are adjacent to the oil jackets and bearing housings. The water jackets around the valve 26 provide an additional cooling method.

A single cylinder engine would require only one rotary exhaust valve 26 within the exhaust valve assembly 24. However, as shown in FIGS. 1-5, the engine system 10 of one example embodiment of the present disclosure may comprise more than one cylinder 12, for example two in-line cylinders 12*a*, 12*b*, which will require a rotary exhaust valve 26 for each in-line cylinder 12, such that the exhaust valve assembly 24 comprises a first rotary exhaust valve 26*a* and a second rotary exhaust valve 26*b*.

In this way, the engine system 10, as illustrated, may comprise a first cylinder having a first cylinder sidewall 12*a* and a second cylinder having a second cylinder sidewall 12*b*. The respective first cylinder sidewall 12*a* and the second cylinder sidewall 12*b* each define a cylinder bore 18*a*, 18*b* therein, with the cylinder bore 18*a*, 18*b* positioned on a respective bore axis B. The first cylinder sidewall 12*a* further defines a first intake port 14*a* and a first exhaust port 16*a* therein, and the second cylinder sidewall 12*b* further defines a second intake port 14*b* and a second exhaust port 16*b* therein. The system 10 further comprises a first piston assembly and a second piston assembly operatively connected to the engine crankshaft 32. Each piston assembly comprising a piston 22*a*, 22*b* (shown in further detail in FIGS. 9A-9B) and a connector arm 30*a*, 30*b*, wherein the connector arm 30*a*, 30*b* operatively couples the respective piston 22*a*, 22*b* to the engine crankshaft 32.

As such, as shown in FIGS. 6-8, the two-cylinder system 10 may further comprise a first rotary exhaust valve 26*a* associated with the first cylinder 12*a* and the first exhaust port 16*a* and a second rotary exhaust valve 26*b* associated with the second cylinder 12*b* and the second exhaust port 16*b*. The first rotary exhaust valve 26*a* and the second rotary exhaust valve 26*b* shall be substantially identical, each having a valve body, with the first valve body defining a first valve void 34*a* therethrough and the second valve body defining a second valve void 34*b* therethrough. The first valve void 34*a* may have a first void center 35*a* and the second valve void 34*b* may have a second void center 35*b*. While the dimensions of the valve voids 34*a*, 34*b* may be customized for particular engine architectures, the valves 26*a*, 26*b* remain symmetrical and substantially identical to one another in each such embodiment.

The second rotary exhaust valve 26*b* may be positioned in a chamber between the stub port 50 of the second cylinder 12*b* and the exhaust pipe 20. The second rotary exhaust valve 26*b* may be supported on the second plurality of bearings 38 on one side and a third plurality of bearings the opposite side 40. The bearings 38, 40 are shaped in such a way as to align with the exhaust port 16*b* and interface with additional apertures formed in the cylinder sidewall 12*b*. The second rotary exhaust valve 26*b* further comprises a third plurality of seal rings 46 and a fourth plurality of seal rings 48. These seal rings 42, 44 serve multiple functions commensurate with those discussed with respect to the first rotary exhaust valve 26*a*.

The rotary exhaust valves 26*a*, 26*b* may be further disposed on and rotatable about a valve axis V. More particularly, the second rotary exhaust valve 26*b* is aligned with and positioned laterally adjacent to the first rotary exhaust valve 26*a*. In this way, the first and second rotary exhaust valves 26*a*, 26*b* are coupled linearly, such that the same share the support of the second plurality of bearings 38 therebetween, as shown in FIGS. 7-8. Moreover, the second valve void 34*b* is positioned on the valve axis V relative to the first valve void 34*a* at a rotation of about ninety degrees, such that a first void plane running through the first void center 35*a* is orthogonal to a second void plane running through the second void center 35*b*.

The valve phasing assembly 28 (FIGS. 1, 2, and 6) is fastened to the end of the first rotary exhaust valve 26*a*, such that the first plurality of bearings 36 and first plurality of seals 42 are disposed between the valve phasing assembly 28 and the first rotary exhaust valve 26*a*. The phasing assembly 28 controls or adjusts the position of the rotary exhaust valve(s) 26 relative to the crankshaft 52 position, such that the timing and rotational speed about axis V of the rotary exhaust valve (s0 26 may be varied by the valve phasing assembly 28 relative to crankshaft timing at various engine speeds and loads in accordance with a defined control strategy.

The valve axis V, on which the rotary exhaust valve(s) 26*a*, 26*b* are positioned, is spaced apart and parallel to the crankshaft axis C, on which the engine crankshaft 52 is positioned. The engine crankshaft 52 is rotatable about the crankshaft axis C in a predetermined direction at a first speed, and the rotary exhaust valve(s) 26*a*, 26*b* are rotatable about the valve axis V in the same predetermined direction at a second speed.

Controlling the rotary exhaust valve(s) 26 to crankshaft 52 speed relationship at various engine speeds and loads, as well as timing the rotary valve 26 appropriately, along with the supercharger 49, creates an engine system 10 that operates due to a pressure balance between the intake manifold 54, the cylinder bore 18, and the exhaust system 50, 26, 20. Said another way, the rotary exhaust valve 26 acts as a throttle, defining a pressure balance between the intake system 49, 54, 14 (with pressure P1), the cylinder bore 18 (with pressure P2), the stub port 50 (with pressure P3), and the exhaust pipe 20 (with pressure P4), which will resultantly determine the mass of air entering the engine system 10 and directly controlling the available power and torque output of the engine system 10.

Figure 10:
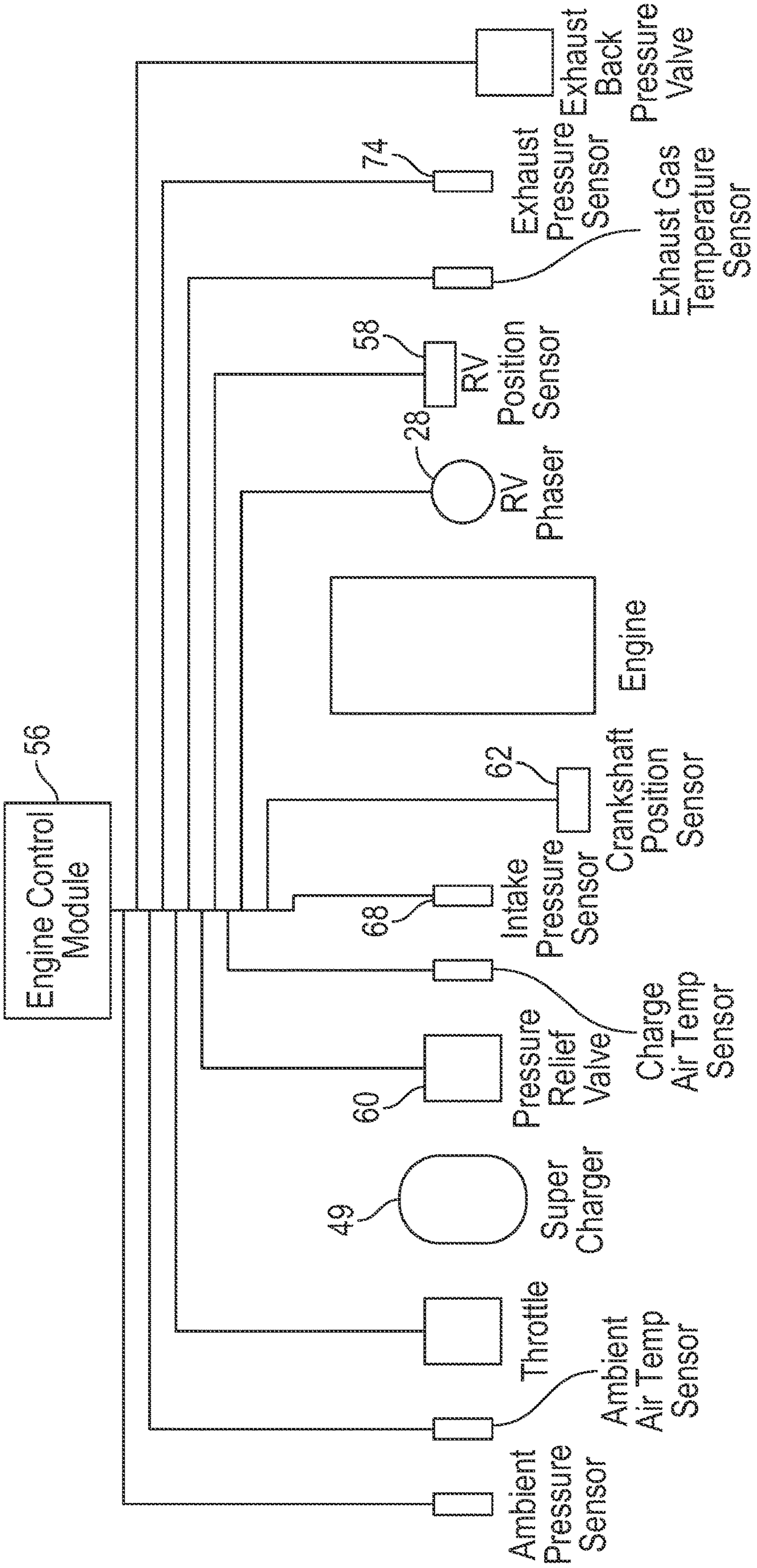
FIG. 10 is a schematic sensor diagram of the example engine architecture of the present disclosure.

In some embodiments, these aims may be accomplished using a plurality of sensors that convey signals to an engine control unit 56, as shown in schematic in FIG. 10. Moreover, pressure may be monitored by a plurality of pressure sensors 68, 70, 72, 74 throughout the engine system 10 and reported via signals to and from the engine control unit 56.

The sensors 58, 62, 68, 70, 72, 74 described herein are configured to monitor physical system characteristics and generate signals that correlate to such physical system characteristics. Moreover, the system 10 may further include a crankshaft position sensor 62 in fluid communication with the crankshaft 52 and a rotary exhaust valve position sensor 58 in fluid communication with the rotary exhaust valve 26. More particularly, the crankshaft position sensor 62 monitors engine crankshaft position and engine speed (RPM), and the rotary exhaust valve position sensor 58 monitors the rotary valve position and rotary valve speed (RPM).

The system 10 may also comprise an intake pressure sensor 68 configured to monitor a pressure P1 at the intake port 14, a cylinder pressure sensor 70 configured to monitor a pressure P2 within the cylinder or combustion chamber, a stub port pressure sensor 72 configured to monitor a pressure P3 within the stub port 50, and an exhaust pressure senor 74 configured to monitor a pressure P4 within the exhaust pipe 20.

The Engine Control Unit 56 may be a stand-alone unit or be part of an electronic controller that regulates the operation of the engine system 10. The engine control unit 56 may be embodied as a host machine or distributed system, e.g., a digital computer or microcomputer, acting as a vehicle control module, and/or as a proportional-integral-derivative (PID) controller device having a processor, and tangible, non-transitory memory such as read-only memory (ROM) or flash memory. The engine control unit 56 may also have random access memory (RAM), electrically erasable programmable read only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Therefore, the engine control unit 56 can include all software, hardware, memory, algorithms, connections, sensors, etc., necessary receive signal inputs from the aforementioned sensors to monitor engine operation.

The engine control unit 56 may further execute routines stored therein to control the aforementioned sensors and actuators to control engine operation, including throttle position, fuel injection mass and timing, supercharger 49 boost and speed, and control of intake and/or rotary exhaust valve timing, phasing, etc. The routines or processes may be embodied as control strategy instructions and are preferably executed during preset loop cycles. Routines or control strategy instructions are written on the tangible, non-transitory memory of at least one processing unit and are executed by such a central processing unit, and thereby are operable to monitor inputs from sensing devices and other networked control modules and execute control and diagnostic routines to control operation of actuators. Loop cycles may be executed at regular intervals or executed in response to occurrence of an event.

As detailed herein above, the exhaust valve assembly 24 along with the engine control unit 56 and the valve phasing assembly 28 controls the exhaust cycle of the engine system 10 relative to crankshaft timing, via the at least one engine control strategy of the present methods 100, 200. The use of the rotary exhaust valve 26 and the valve phasing assembly 28 allows for alterations to the fixed time and location at which the exhaust port 16 is opened and closed by the piston 22 with respect to the respective engine cycle.

As detailed in FIGS. 11-14J, in this way, the engine system 10 of the present disclosure may operate via a six-stage power cycle process or control scheme 100, per revolution of the crankshaft 52, (illustrated throughout FIGS. 14A-14J), thereby providing increased power output. Alternatively, as detailed in FIGS. 15-16J, in this way, the engine system 10 of the present disclosure may operate via a six-stage over-expansion cycle process or control scheme 200, per revolution of the crankshaft 52, (illustrated throughout FIGS. 16A-16J) thereby utilizing the exhaust gas valve 26 to force an asymmetry in exhaust timing opposite of the power cycle control scheme to provide for improved thermal efficiencies of the engine system 10.

Figure 11:
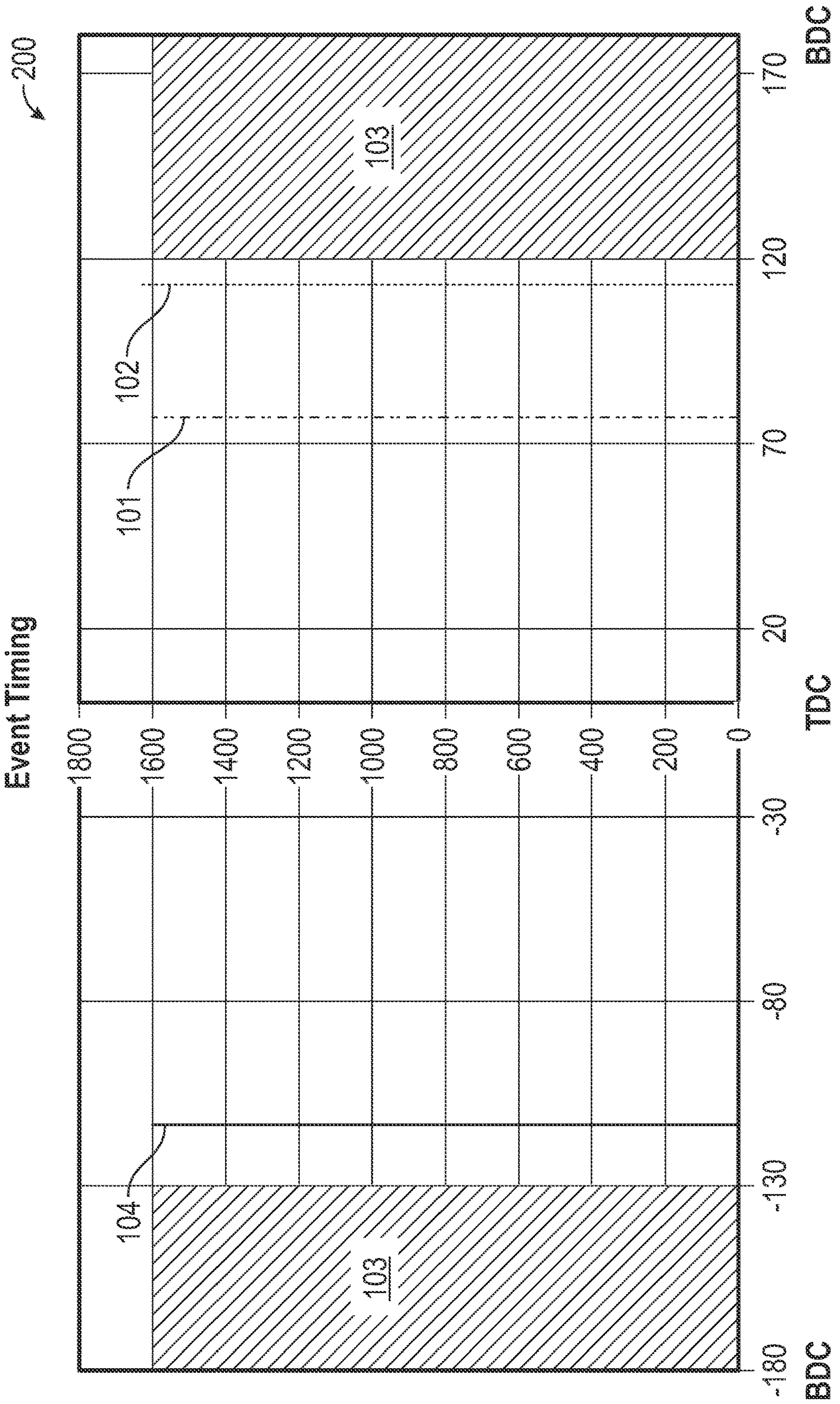
FIG. 11 is an illustrative cycle graph of the steps of the present method of operation or control strategy of the example engine architecture of the present disclosure in a power cycle control scheme.
Figure 14A:
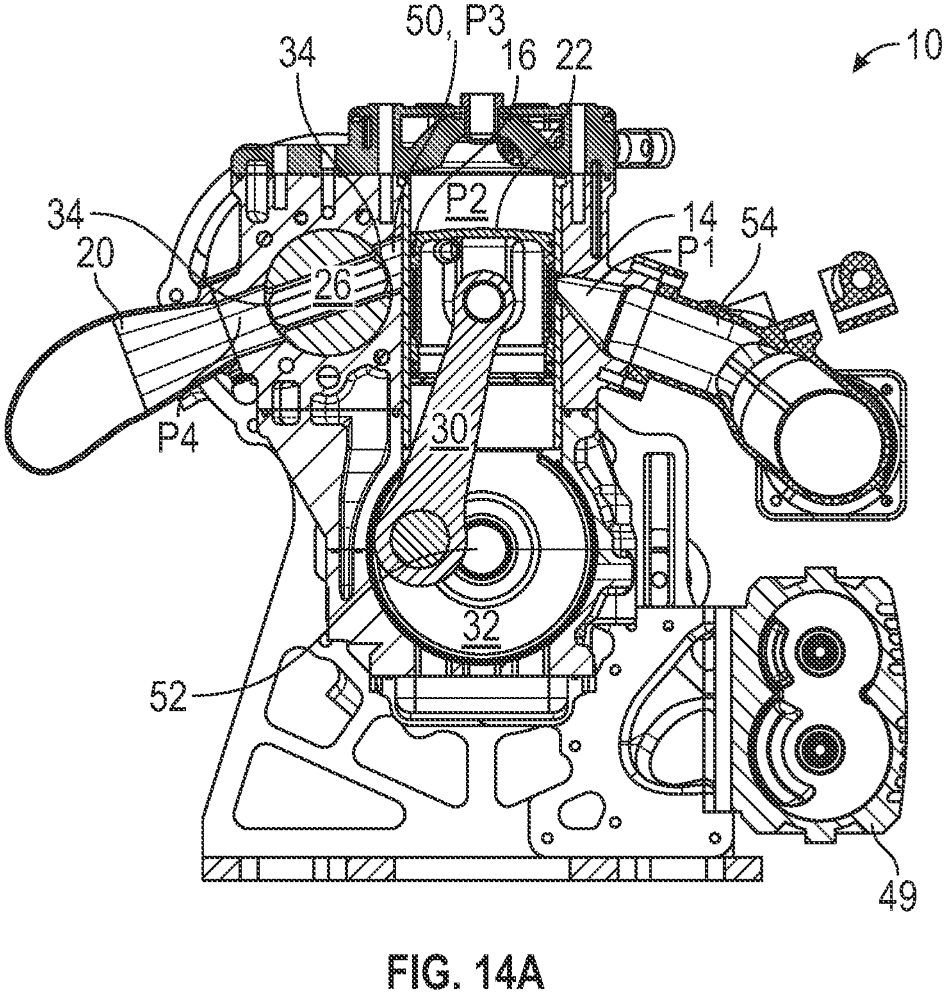
FIG. 14A is a is a schematic cross-sectional view of the example engine architecture of the present disclosure taken along line A-A in FIG. 5, showing the exhaust port open event in relation to crankshaft positioning within the engine in a power cycle control scheme.
Figure 14B:
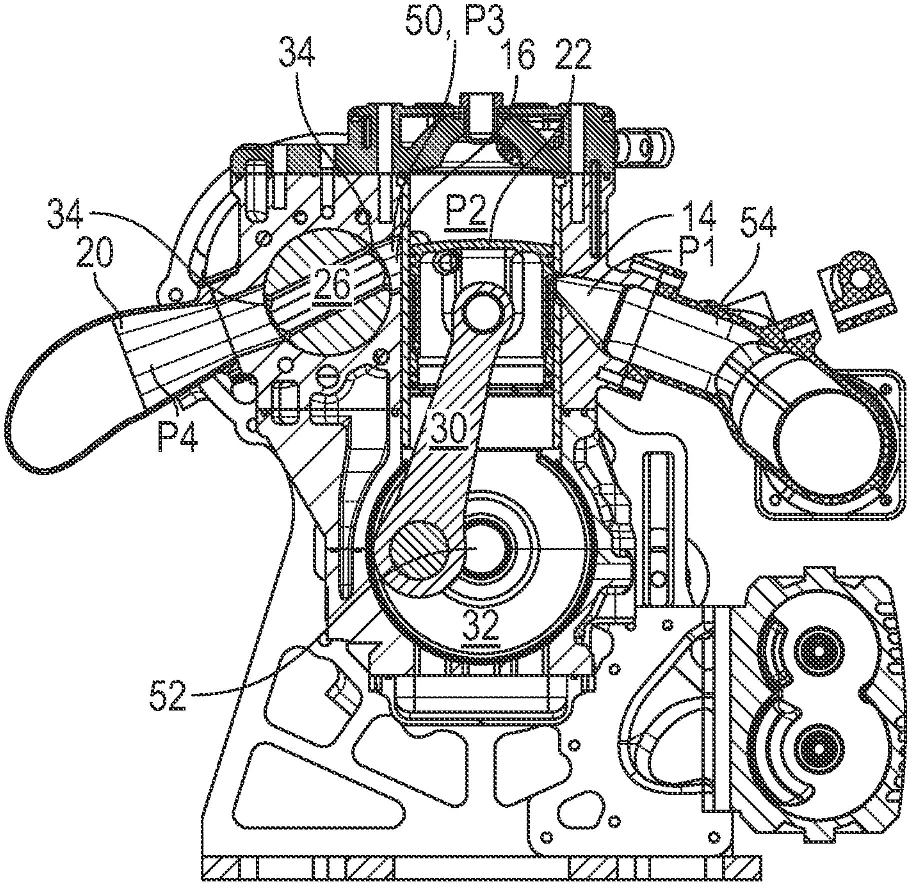
FIG. 14B is a schematic cross-sectional view of the example engine architecture of the present disclosure taken along line A-A in FIG. 5, showing the initiation of the exhaust cycle of the engine in the power cycle control scheme.
Figure 14C:
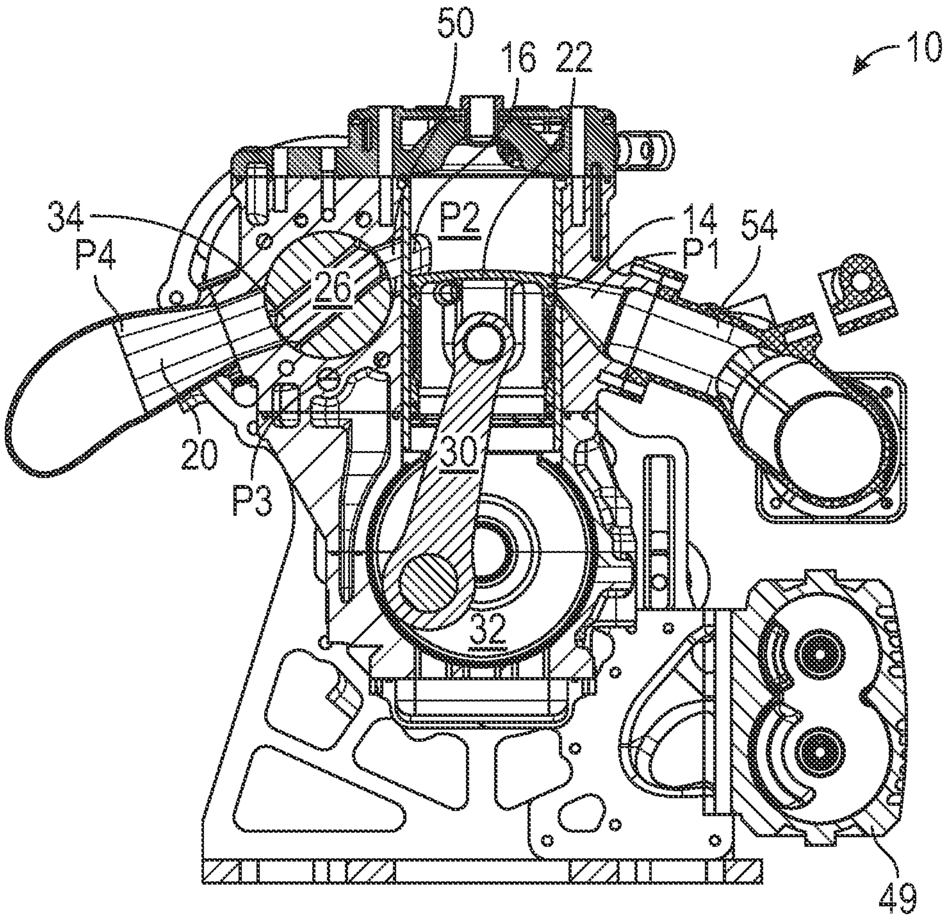
FIG. 14C is a is a schematic cross-sectional view of the example engine architecture of the present disclosure taken along line A-A in FIG. 5, showing the intake open event in relation to crankshaft positioning within the engine in the power cycle control scheme.
Figure 14D:
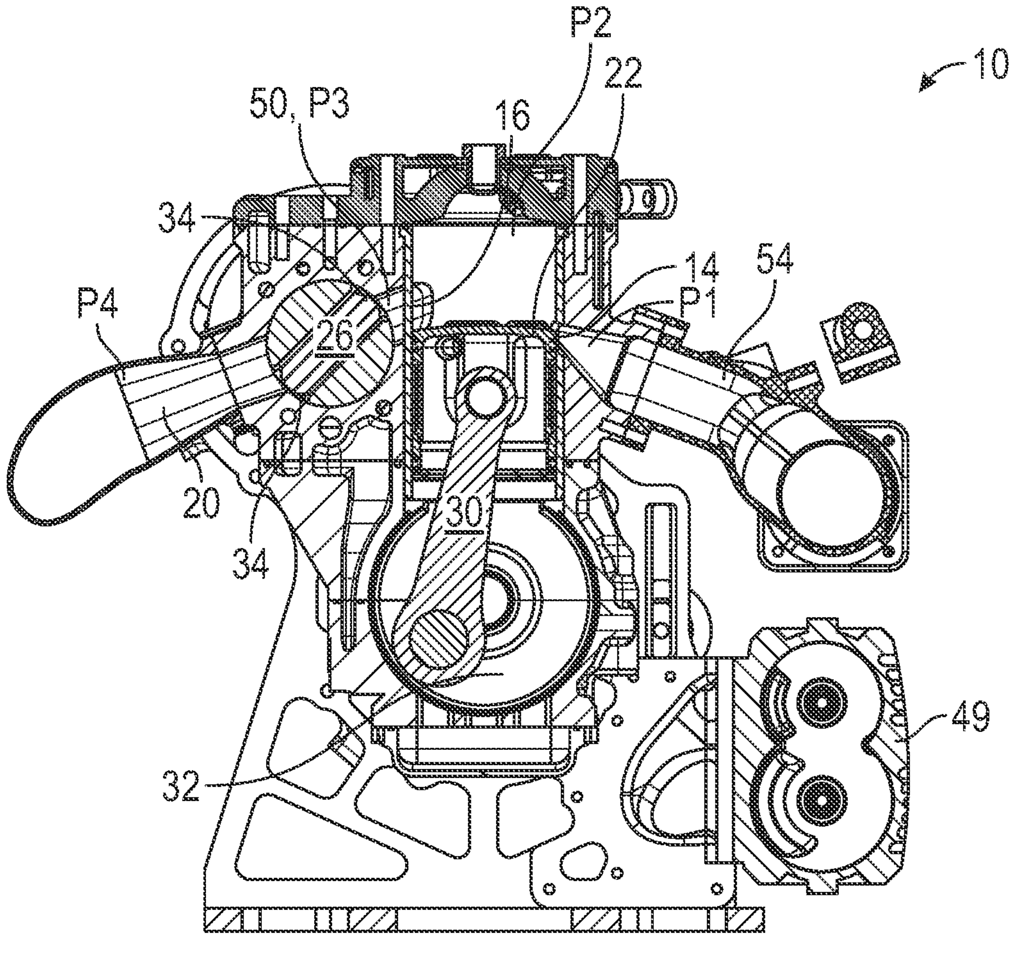
FIG. 14D is a schematic cross-sectional view of the example engine architecture of the present disclosure taken along line A-A in FIG. 5, showing the initiation of the cylinder flush or cylinder scavenging cycle of the engine in the power cycle control scheme.
Figure 14E:
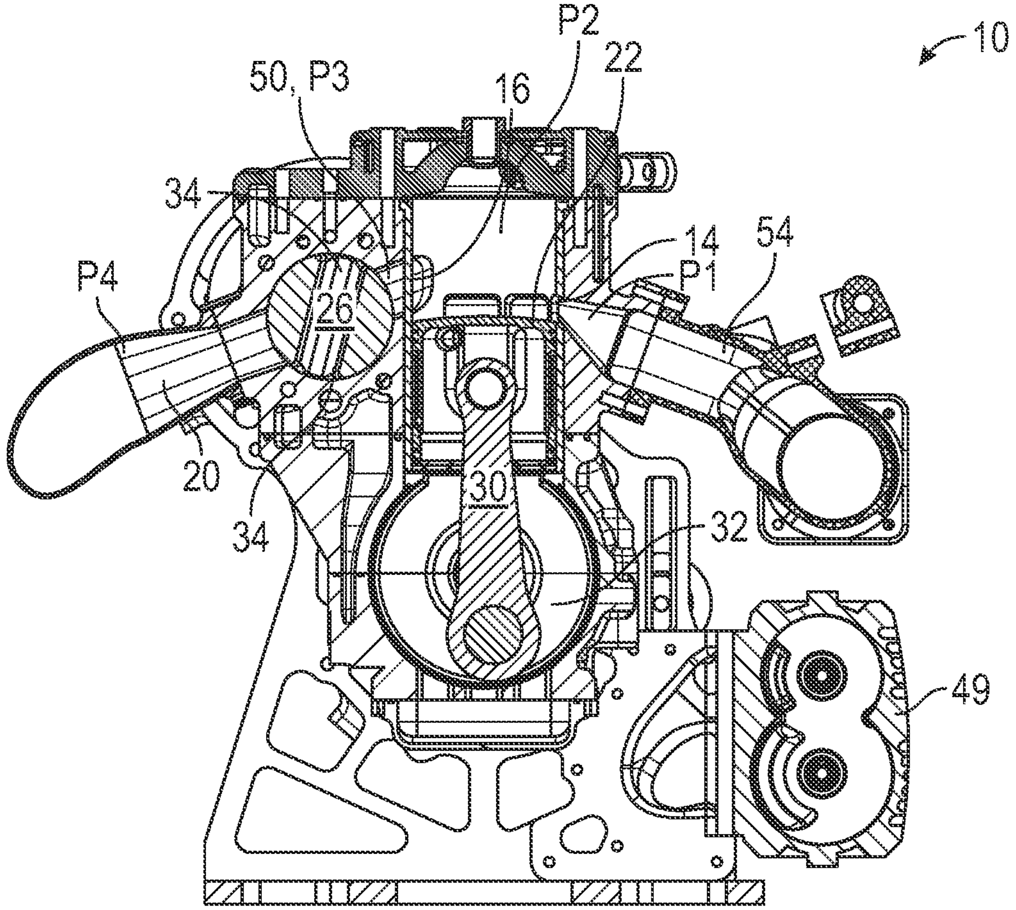
FIG. 14E is a is a schematic cross-sectional view of the example engine architecture of the present disclosure taken along line A-A in FIG. 5, showing the exhaust close event in relation to crankshaft positioning within the engine in the power cycle control scheme.
Figure 14F:
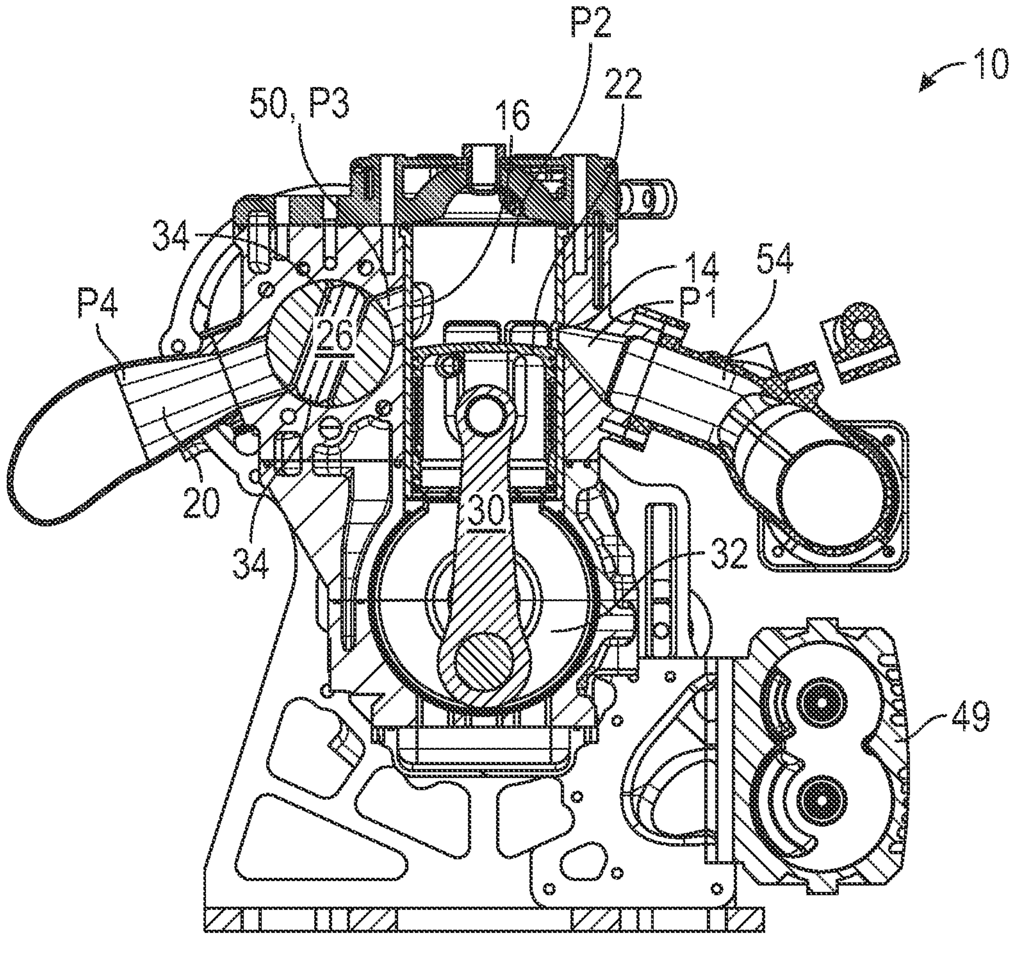
FIG. 14F is a schematic cross-sectional view of the example engine architecture of the present disclosure taken along line A-A in FIG. 5, showing the initiation of the cylinder charging cycle of the engine in the power cycle control scheme.
Figure 14G:
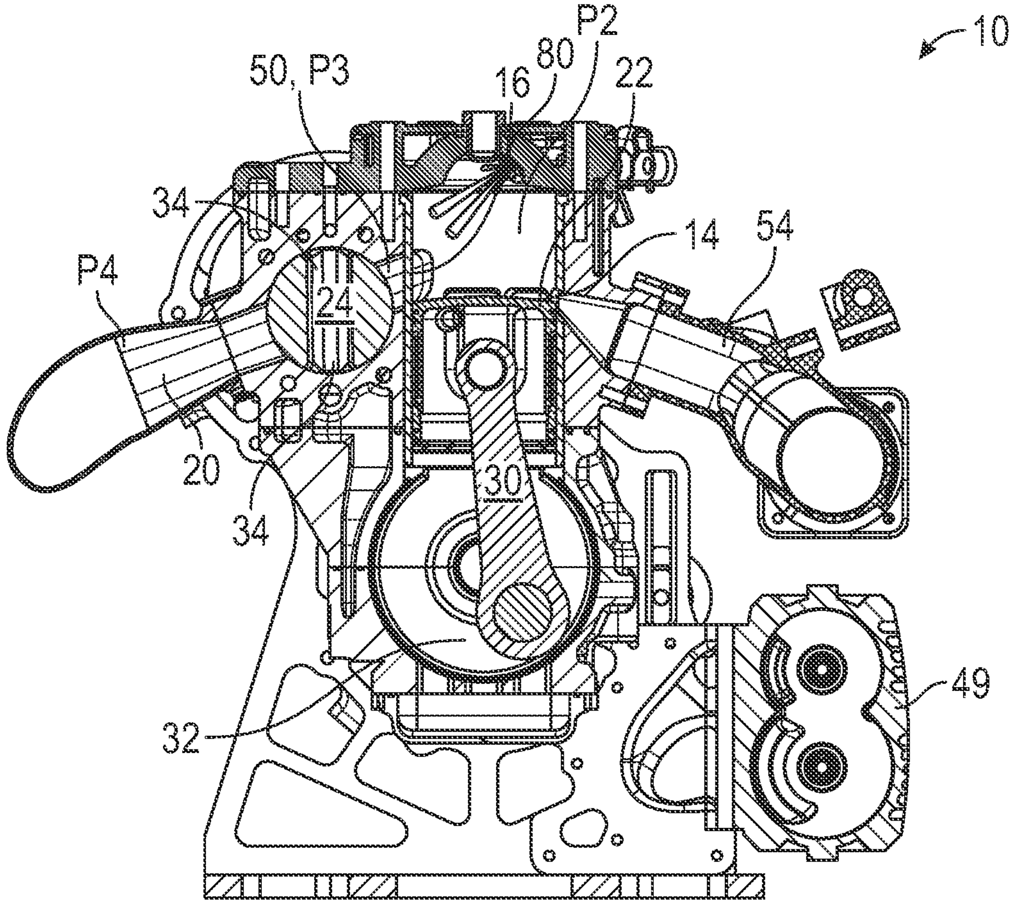
FIG. 14G is a fourth schematic cross-sectional view of the example engine architecture of the present disclosure taken along line A-A in FIG. 5, showing the injection cycle of the engine in the power cycle control scheme.
Figure 14H:
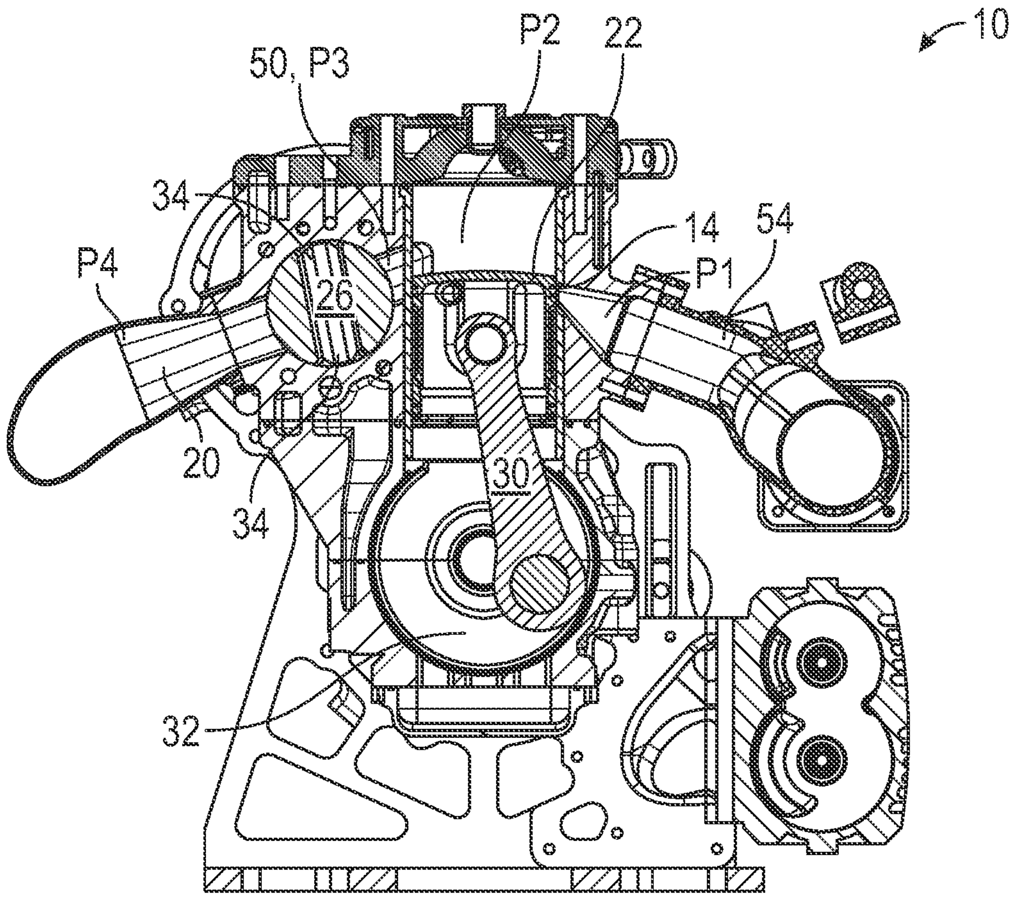
FIG. 14H is a schematic cross-sectional view of the example engine architecture of the present disclosure taken along line A-A in FIG. 5, showing the compression cycle of the engine in the power cycle control scheme.
Figure 14I:
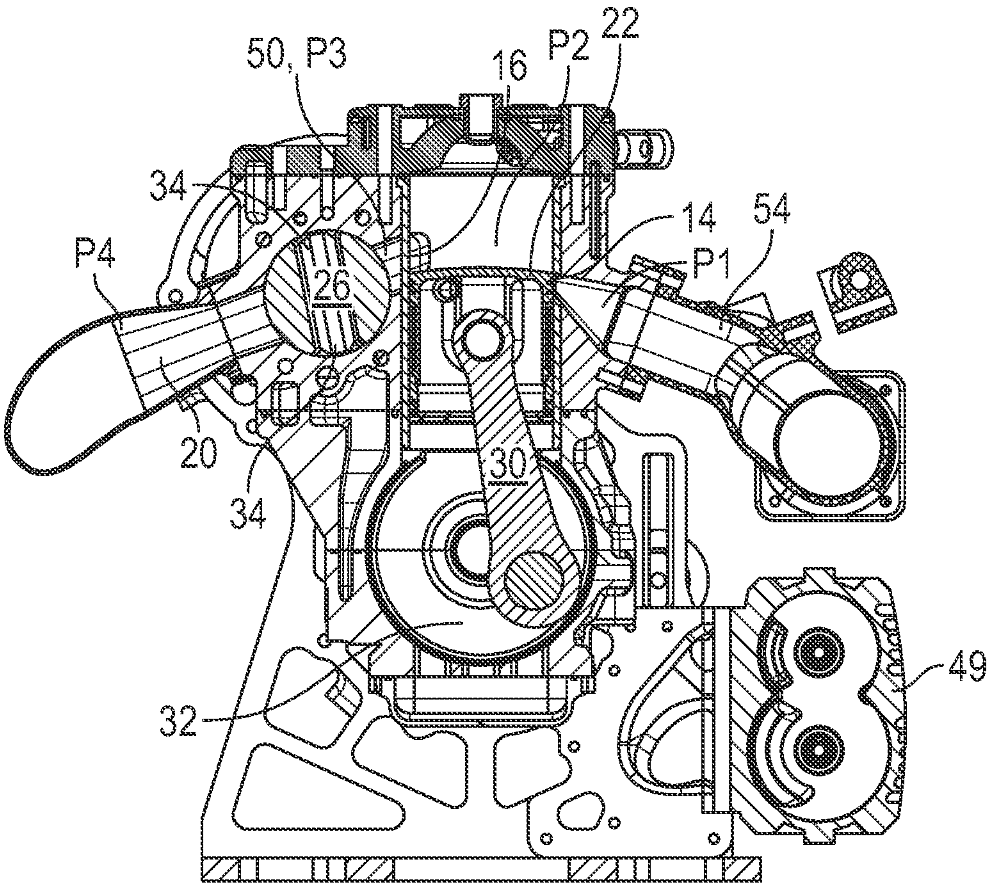
FIG. 14I is a is a schematic cross-sectional view of the example engine architecture of the present disclosure taken along line A-A in FIG. 5, showing the intake close event in relation to crankshaft positioning within the engine in the power cycle control scheme.
Figure 14J:
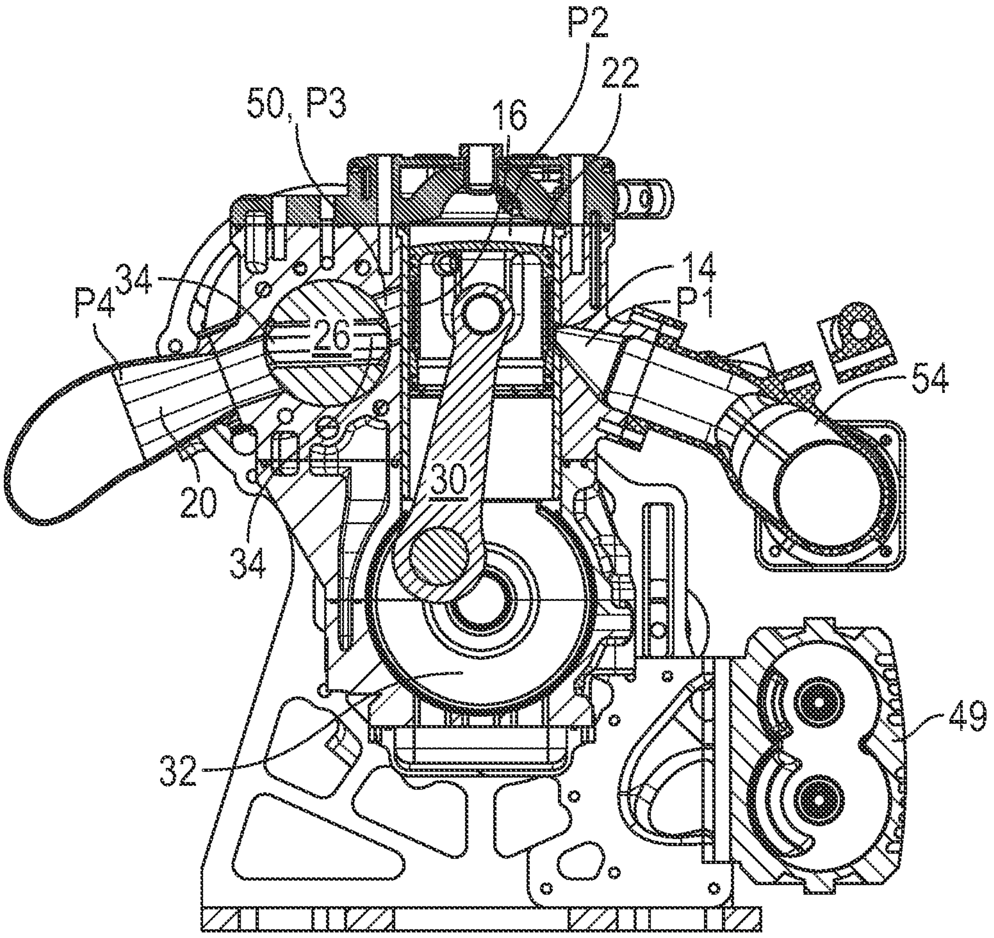
FIG. 14J is a schematic cross-sectional view of the example engine architecture of the present disclosure taken along line A-A in FIG. 5, showing the power cycle of the engine in the power cycle control scheme.

First, in the power cycle control scheme 100, as illustrated in FIGS. 11 and 14A-14B, the exhaust cycle is shown with respect to crankshaft 52 positioning. The exhaust cycle initially begins when the piston 22 begins a downward motion along the bore axis B and exposes the exhaust port 16. As such, during the exhaust cycle of the engine system 10, the intake port 14 is closed as it remains covered by the piston 22, but the exhaust port 16 is opened (event 101 in FIGS. 11 and 13) as the piston 22 has moved vertically downward of the fixed location of the exhaust port 16. Moreover, during the exhaust cycle, the valve void 34 is aligned with the exhaust port 16, such that exhaust gas may flow from the cylinder bore 18 via the stub port 50 to the exhaust gas pipe 20. Said another way, the exhaust gas port 16 is opened (at event 101 in FIG. 11) during the exhaust cycle when the crankshaft position sensor 62 indicates that the crankshaft position angle is about 80 degrees after top dead center (ATDC), and the exhaust cycle extends for a duration that is defined from a time at which the crankshaft position sensor 62 indicates that the crankshaft position angle is about 80 degrees to a time at which the crankshaft position sensor 62 indicates that the crankshaft position angle is about 110 degrees. Once the crankshaft position angle reaches about 100 degrees the intake port 14 opens (at event 102 in FIG. 11).

Second, as illustrated in FIGS. 11-12 and 14C-14D the cylinder flushing cycle of the engine system 10 is shown with respect to crankshaft 52 positioning. The cylinder flushing cycle begins when the intake port 14 is opened or uncovered by the piston 22 (event 102 in FIGS. 11 and 13). During the cylinder flushing cycle, the exhaust port 16 remains open (uncovered by the piston 22), but the rotary exhaust valve 26 is starting to close, namely, the valve void 34 is only partially aligned with the exhaust port 16, such that a restricted amount of exhaust gas may move from the cylinder bore 18 to the exhaust gas pipe 50 via the stub port 50. Said another way, the intake port 14 is opened (at event 102 in FIG. 11) during the cylinder flushing cycle when the crankshaft position sensor 62 indicates that the crankshaft position angle is about 110 degrees after top dead center (ATDC), and the cylinder flushing cycle extends for a duration that is defined from a time at which the crankshaft position sensor 62 indicates that the crankshaft position angle is about 110 degrees to a time at which the crankshaft position sensor 62 indicates that the crankshaft position angle is from about 120 degrees after top dead center (ADTC) to about 50 degrees after bottom dead center (ABDC).

The selection or phasing of the closure of the exhaust port 16 via the rotary exhaust valve 26 based upon engine speed and load is paramount to efficient engine system 10 operation. For example, during the cylinder flushing stage the cylinder is flushed of exhaust gas residuals, but such timing of the exhaust port 16 closure event (event 103 in FIG. 11) allows the valve 26 to close in time to ensure very little fresh air or fuel, yet to undergo combustion, leaves exhaust gas port 16. Said another way, having the valve 26 phased to close (event 103 in FIGS. 11 and 13) at different times depending on different engine speeds and loads thereby improves the trapping efficiency of the engine 10 during the cylinder charging phase (detailed herein below and in FIG. 14F). The cylinder flushing cycle ends when the rotary valve 26 fully closes, i.e., the valve void 34 is fully misaligned with the exhaust port 16, which stops any additional flow exhaust gas out of the exhaust port 16 and into the exhaust gas pipe 20, even though the exhaust port 16 remains uncovered by the piston 22.

As contemplated in the present disclosure, the second speed (rotary exhaust valve rotation speed) is about 50% of the first speed (engine crankshaft speed). Said another way, the rotary exhaust valve 26 must rotate slower (at a second speed) than crankshaft 52 or engine speed (a first speed), in order to be properly timed for the next intake and exhaust event. In this way, the rotary exhaust valve 26 shall rotate at about half engine or crankshaft speed 52 to achieve the desired results of closing the exhaust port 16 before the intake port 14 closes, retaining port closure during the compression event, and providing proper timing, i.e., valve alignment for the next engine cycle.

Moreover, having the rotary exhaust valve 26 rotate in the same predetermined direction as the engine crankshaft 52, creates an air flow path, during the cylinder flushing stage (detailed hereinbelow and in FIG. 14D) that flushes the cylinder of exhaust gas residuals but allows the valve 26 to close in time to ensure very little fresh air or fuel yet to undergo combustion leaves exhaust gas port 16. Said another way, having the valve 26 rotate in the same predetermined direction as the engine crankshaft 52 and phased to close (event 103 in FIGS. 11 and 13) at different times depending on different engine speeds and loads thereby improves the trapping efficiency of the engine 10 during the cylinder charging phase (detailed hereinbelow and in FIG. 14F) and aids in the removal of exhaust gas residuals during the cylinder flushing phase (detailed hereinbelow and in FIG. 14D).

In some instances, the engine architecture of the present disclosure may provide for trapping efficiencies over 95%, and even more particularly of up to 97%. For example, when the engine speed or load is lower, i.e., lower crankshaft speed, the exhaust port 16 shall close earlier in the time domain shown as event 103 in FIG. 11, e.g., closer to an engine crankshaft angle of about 120 degrees, whereas when the engine speed or load is higher, i.e., higher or increased crankshaft speed, the exhaust port 16 shall close later in the time domain shown as event 103 in FIG. 11, e.g., closer to an engine crankshaft angle of about 310 degrees. Alteration of the phasing or timing of the exhaust valve 26 closure is effectuated via the valve phasing assembly 28.

Third, as illustrated in FIGS. 11-13 and 14E-14F, the cylinder charging cycle of the engine system 10 is shown with respect to crankshaft 52 positioning. The cylinder charging cycle begins when the exhaust port 16 closes (FIG. 14E; event 103 in FIGS. 11 and 13), due to full misalignment between the valve void 34 and the exhaust port 16. During the cylinder charging cycle, the intake port 14 remains open (uncovered by the piston 22) and the exhaust port 16 remains uncovered by the piston 22, but the valve void 34 is fully misaligned with the exhaust port 16, effectively closing the exhaust port 16, while the exhaust port 16 still remains uncovered by the piston 22. As such, exhaust gas is prohibited from moving from the cylinder bore 18 and the stub port 50 to the exhaust gas pipe 50 via the exhaust port 16. Said another way, the exhaust port 16 is closed (via misalignment with the rotary valve void 34 at event 103 in FIGS. 11 and 13) during the cylinder charging cycle, when the crankshaft position sensor 62 indicates that the crankshaft position angle is from about 120 degrees after top dead center (ATDC) to about 65 degrees after bottom dead center (ABDC). The selected timing or phasing of the closure of the exhaust port 16 via the rotary exhaust valve 26 within the duration or time domain is dynamically based upon engine speed and load as detailed above, whereas when the engine speed or load is higher, i.e., higher or increased crankshaft speed, the exhaust port 16 shall close later in the time domain shown as event 103 in FIG. 11.

As contemplated in the disclosure, cylinder charging is essentially what sets apart the power cycle control scheme of the present invention from an ordinary two-stroke engine. With the valve void 34 fully misaligned with the exhaust port 16, exhaust gas is not able to flow out of the exhaust port 16, eliminating the potential for incoming intake fuel and fresh air to flow directly out of the exhaust port 16 from the intake port 14, without undergoing the combustion process, i.e., the exhaust port 16 (event 103 in FIG. 11) closes before the intake port 14 closes (event 104 in FIG. 11).

Figure 12:
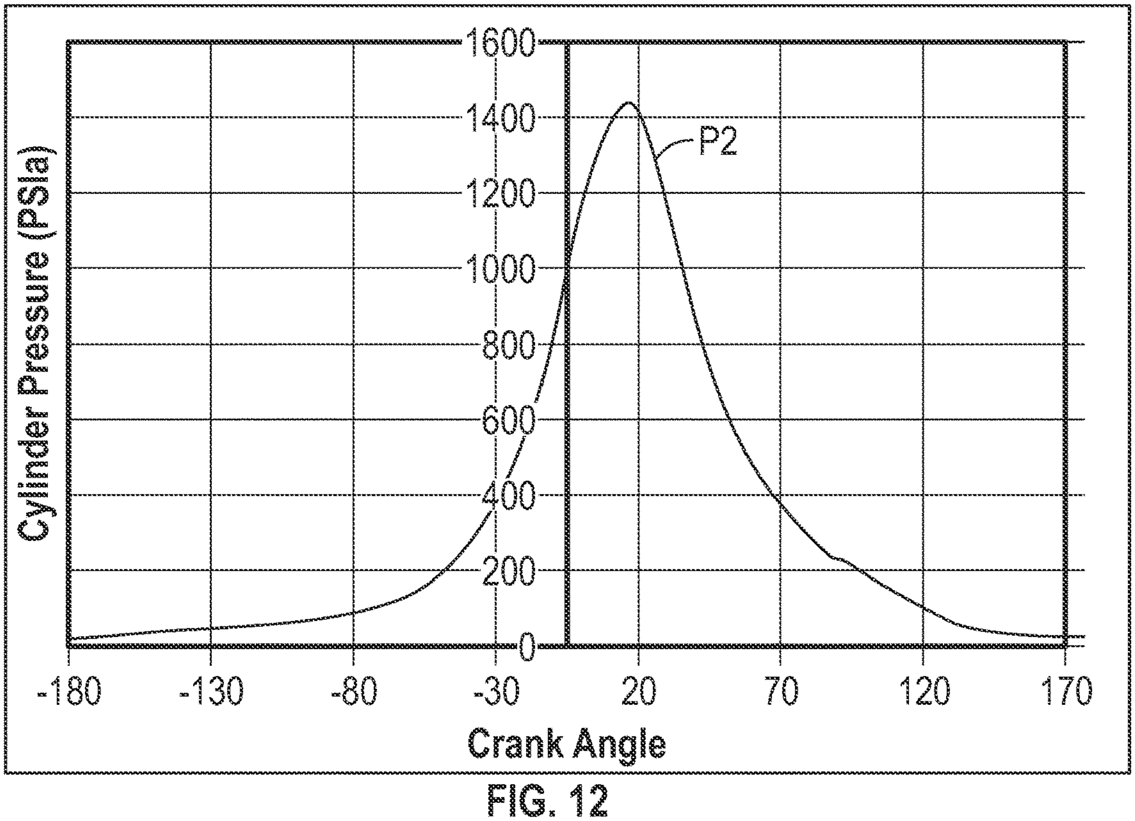
FIG. 12 is an illustrative graph of pressure within the cylinder bore comparative to crankshaft position as the steps of the method shown in FIG. 11 are conducted.
Figure 13:
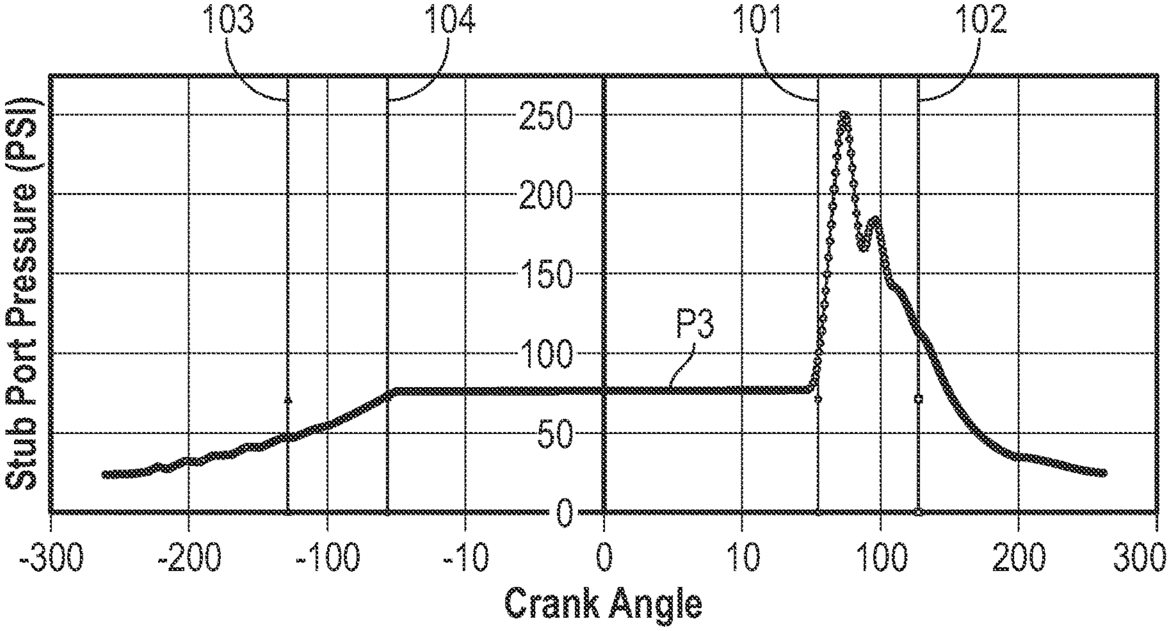
FIG. 13 is an illustrative graph of pressure within the stub port comparative to crankshaft position as the steps of the method shown in FIG. 11 are conducted.

Moreover, during the cylinder charging cycle, additional incoming air is still allowed to enter the cylinder bore 18 via the intake port 14, after the exhaust port 16 is closed (at event 103) due to the misalignment between the valve void 34 and with the exhaust port 16. As such, the additional density or mass of air supplied to the engine, while the exhaust port 16 is closed, allows the pressure within the cylinder bore 18 to be increased above atmospheric pressure as shown in FIG. 12. The closure of the valve 26 in the cylinder charging phase allows for effective supercharging of the engine via the supercharger 49. The cylinder charging phase ends when the piston 22 fully covers the intake port 14 as the piston 22 moves upward along the bore axis B.

Fourth, as illustrated in FIGS. 11-13 and 14G, the injection cycle of the engine system 10 is shown with respect to crankshaft 52 positioning. The injection cycle takes place during one of the cylinder charging cycle (port injection) or the compression cycle (direct injection). During an injection cycle of the engine system 10, an air and fuel mixture is injected into the cylinder bore 18 via at least one fuel injector 80. Each of the intake port 14 and the exhaust port 16 remain open (uncovered by the piston), but the valve void 24 remains fully misaligned with the exhaust port 16, effectively keeping the exhaust port 16 closed while the exhaust port 16 still remains uncovered by the piston 22, such that exhaust gas is prohibited from moving from the cylinder bore 18 and stub port 50 to the exhaust gas pipe 20. The injection cycle is not fixed in time or to a particular crankshaft 52 positioning, but rather floating and may be dependent upon the engine design and injector 80 placement, as well as calibrated based on the speed and load of the engine. As indicated hereinabove, engines equipped with the injector 80 located in the intake port 14 will have the injection cycle timed during the cylinder charging cycle and can occur between when the rotary exhaust valve 26 closes and when the intake port 14 closes, whereas engines equipped with the injector 80 located in the combustion chamber (direct injection) may have the injection cycle occur either during one of the cylinder charging cycle, the compression cycle, or during both the cylinder charging cycle and the compression cycle, and can be timed between when the rotary valve 26 closes and prior to ignition.

Fifth, as illustrated in FIGS. 11-13 and 14H-14I, the compression cycle of the engine system 10 is shown with respect to crankshaft 52 positioning. The compression cycle begins when the piston is actuated upward along the bore axis B, such that the intake port 14 is closed by the piston 22 (event 104 in FIGS. 11 and 13), but the exhaust port remains open (uncovered by the piston), but the valve void 34 is still fully misaligned with the exhaust port 16, effectively keeping the exhaust port 16 closed while the exhaust port 16 still remains uncovered by the piston 22.

During the compression cycle the piston 22 continues to move upward along bore axis B, to compress the gas in the cylinder bore 18 (engine combustion chamber). Given that the rotary valve 26 is closed, the compression cycle may begin as soon as the intake port 14 is fully sealed by the piston 22 but before the exhaust port is partially or fully sealed by the piston 22. Said another way, the intake port 14 is closed (event 104) during the compression cycle when the crank shaft position sensor 62 indicates that the crank shaft position angle is about 65 degrees after bottom dead center (ABDC), and the compression cycle extends for a duration that is defined from a time at which the crankshaft position sensor 62 indicates that the crankshaft position angle is about 65 degrees after bottom dead center (ABDC) to a time at which the crankshaft position sensor 62 indicates that the crankshaft position angle is about 20 degrees before top dead center (BTDC). At the conclusion of the duration, ignition occurs.

Sixth, as illustrated in FIGS. 11-13 and 14J, the power cycle of the engine system 10 is shown with respect to crankshaft 52 positioning. The power cycle occurs immediately after ignition occurs and as the piston 22 starts moving downward along the bore axis B. During a power cycle of the engine system 10, each of the intake port 14 and the exhaust port 16 are closed and sealed by the piston 22, and the valve void 26 is partially aligned with the exhaust port 16. The power cycle ends as soon as the piston 22 moves far enough downward along the bore axis B to uncover the exhaust port 16, thereby beginning the exhaust cycle at event 101 in FIGS. 11 and 13.

Figure 15:
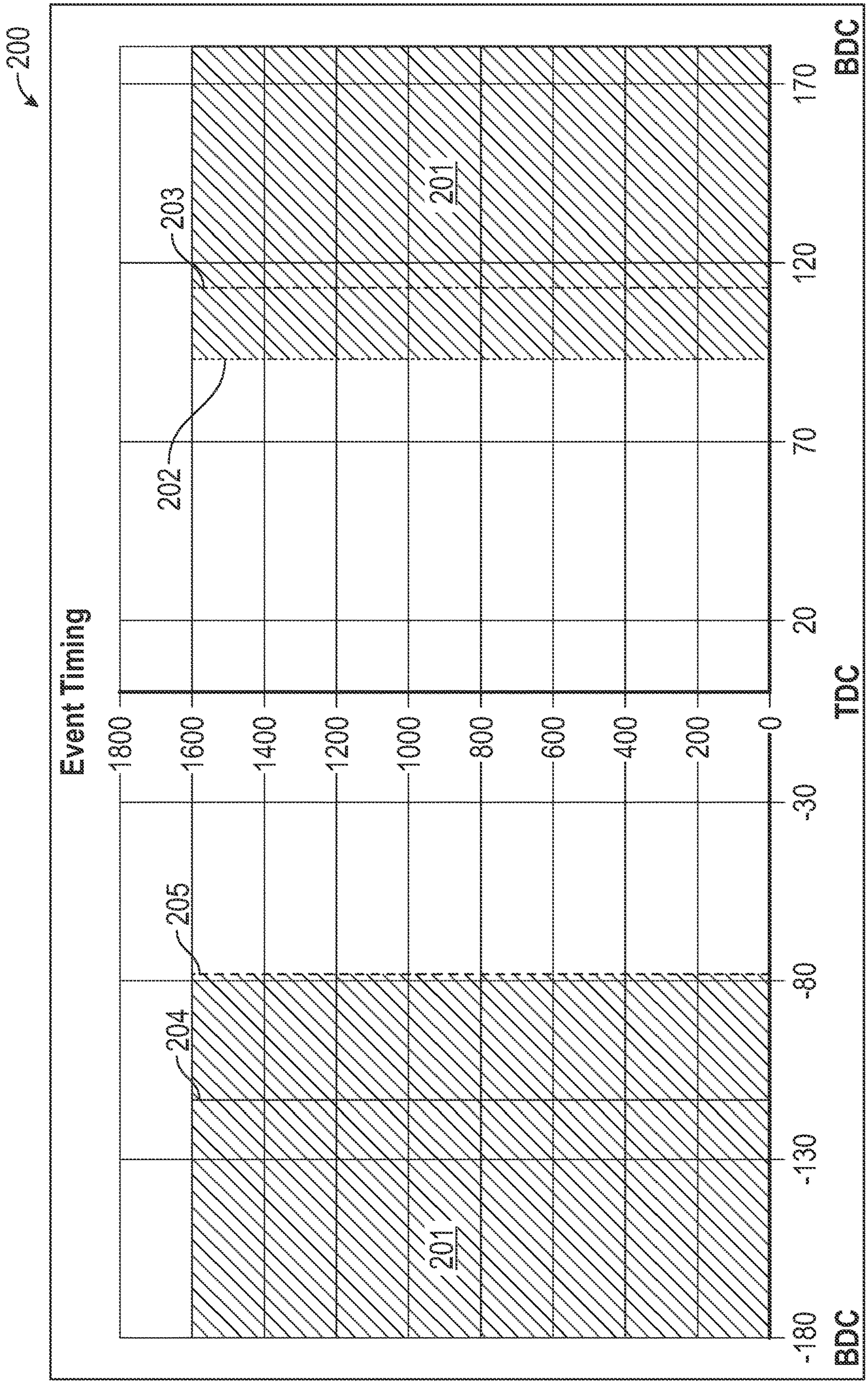
FIG. 15 is an illustrative cycle graph of the steps of the present method of operation or control strategy of the example engine architecture of the present disclosure in an over-expansion cycle control scheme.
Figure 16A:
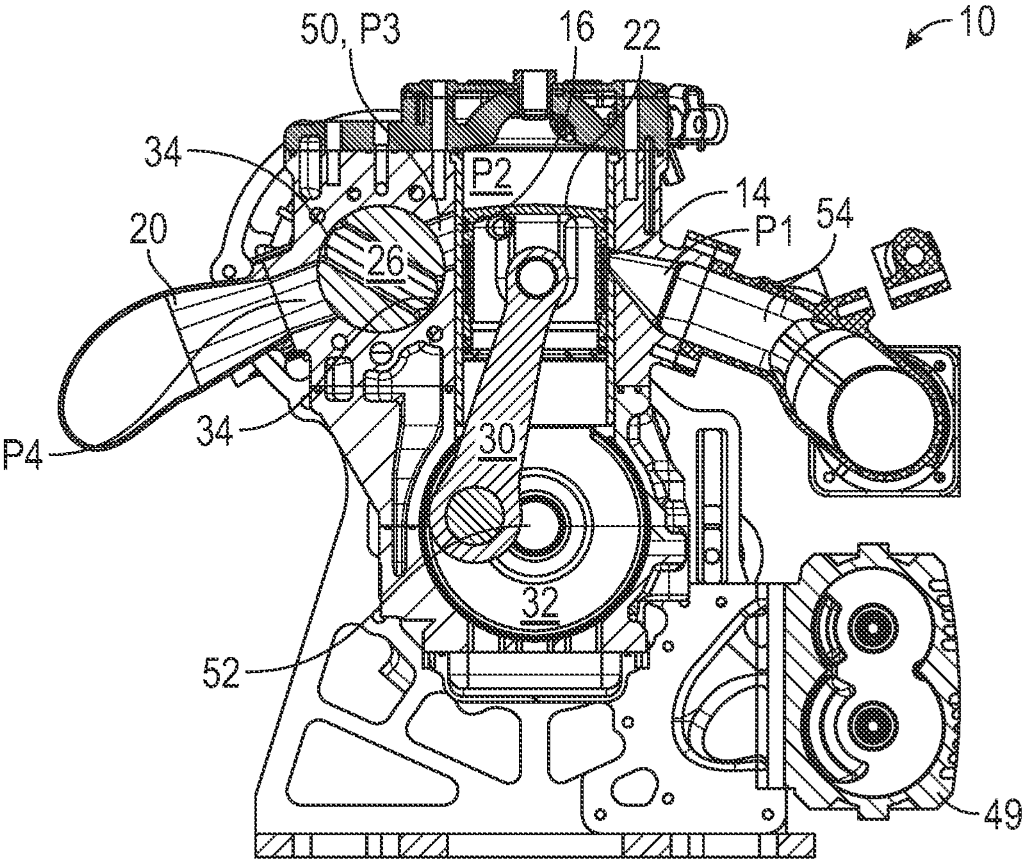
FIG. 16A is a schematic cross-sectional view of the example engine architecture of the present disclosure taken along line A-A in FIG. 5, showing the initiation of the exhaust cycle of the engine in the over-expansion cycle control scheme, i.e., the exhaust port is open, but the rotary exhaust valve remains closed.
Figure 16B:
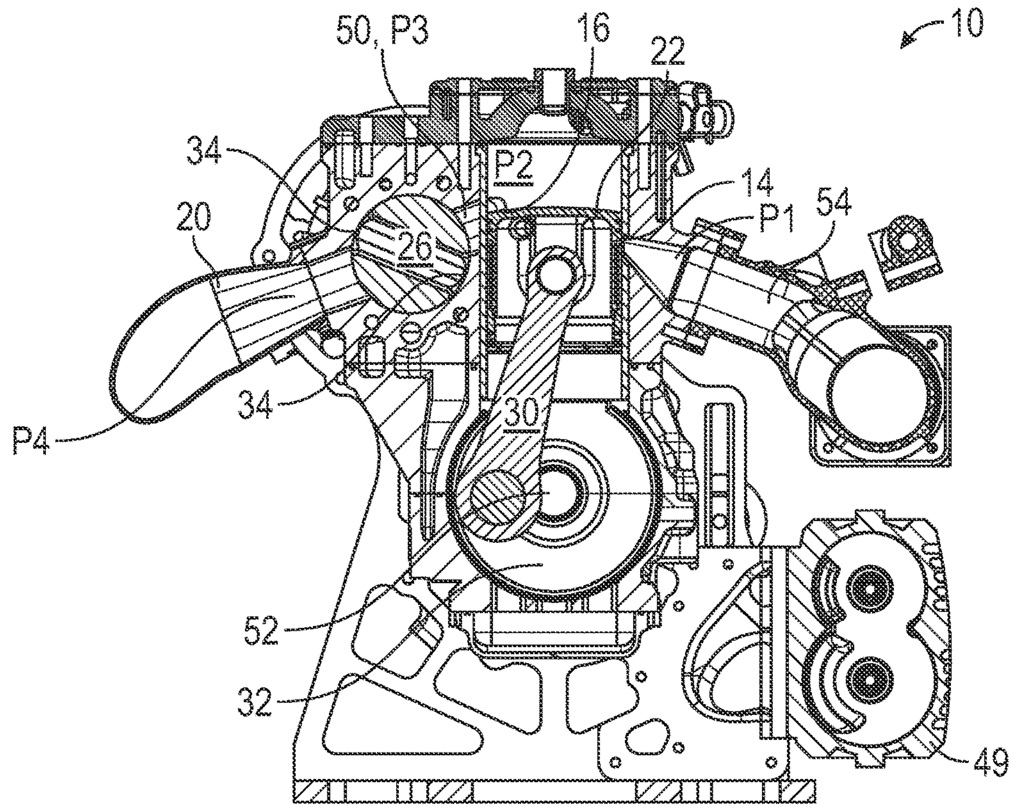
FIG. 16B is a schematic cross-sectional view of the example engine architecture of the present disclosure taken alone line A-A in FIG. 5, showing the exhaust valve open event in relation to crankshaft positioning within the engine in an over-expansion cycle control scheme.
Figure 16C:
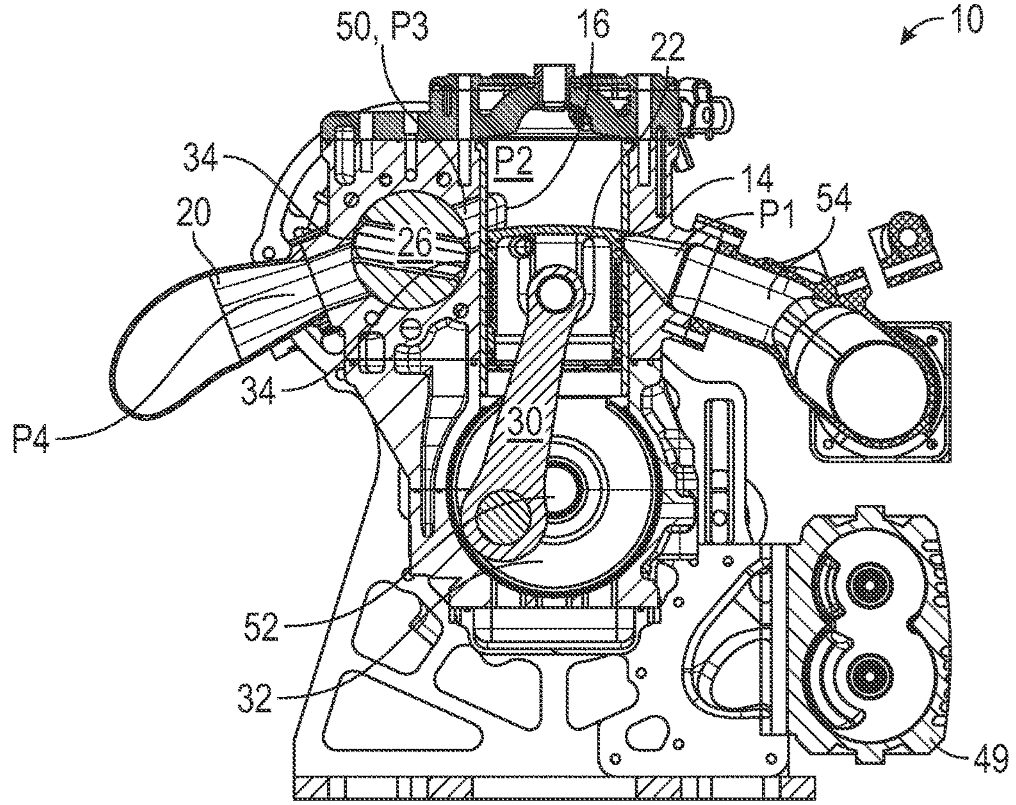
FIG. 16C is a is a schematic cross-sectional view of the example engine architecture of the present disclosure taken along line A-A in FIG. 5, showing the intake open event in relation to crankshaft positioning within the engine in the over-expansion cycle control scheme.
Figure 16D:
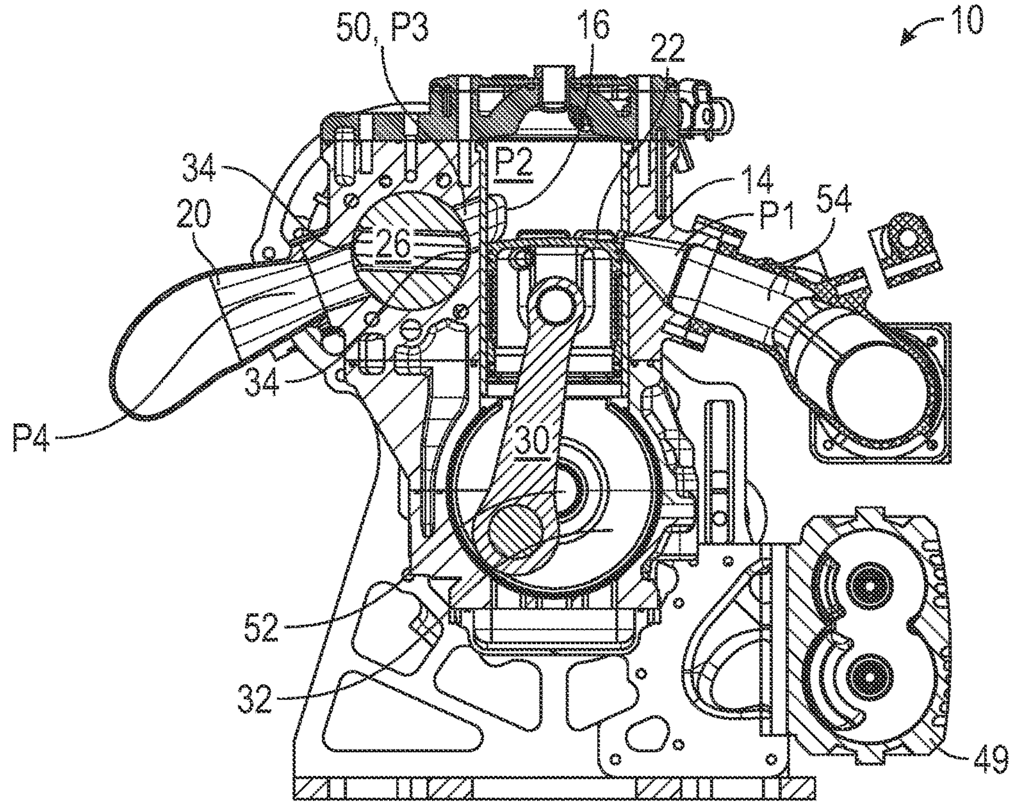
FIG. 16D is a schematic cross-sectional view of the example engine architecture of the present disclosure taken along line A-A in FIG. 5, showing the initiation of the cylinder scavenging cycle of the engine in the over-expansion cycle control scheme.
Figure 16E:
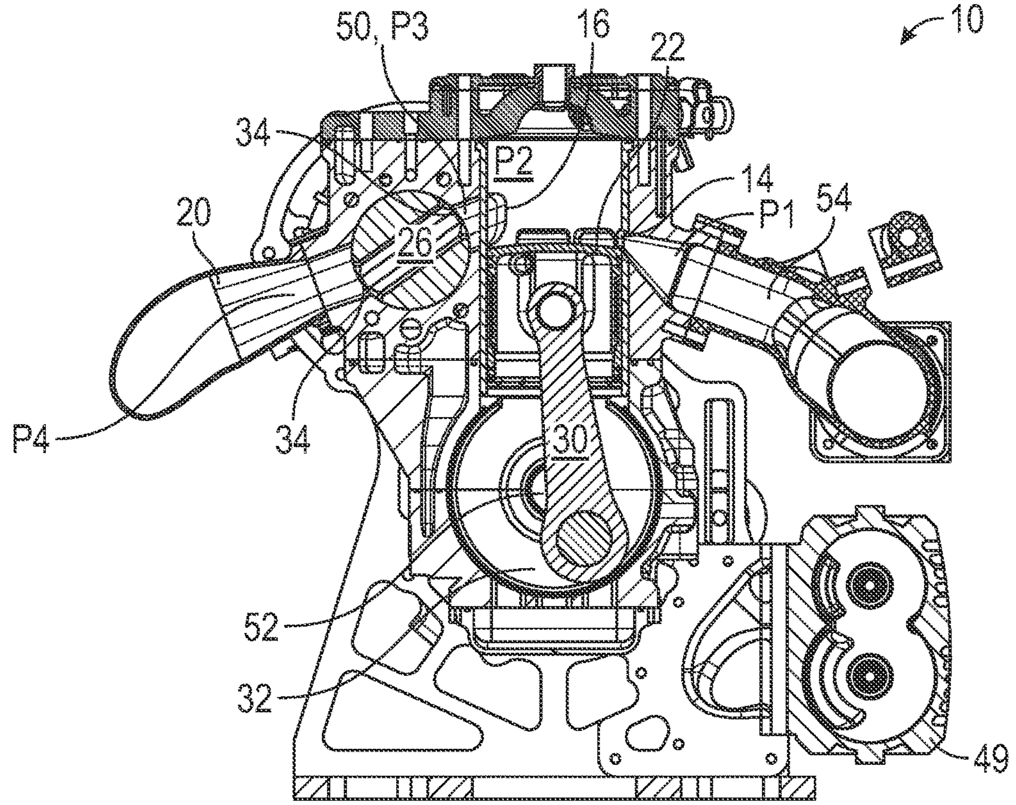
FIG. 16E is a schematic cross-sectional view of the example engine architecture of the present disclosure taken along line A-A in FIG. 5, showing the initiation of the cylinder charging cycle of the engine in the over-expansion cycle control scheme.
Figure 16F:
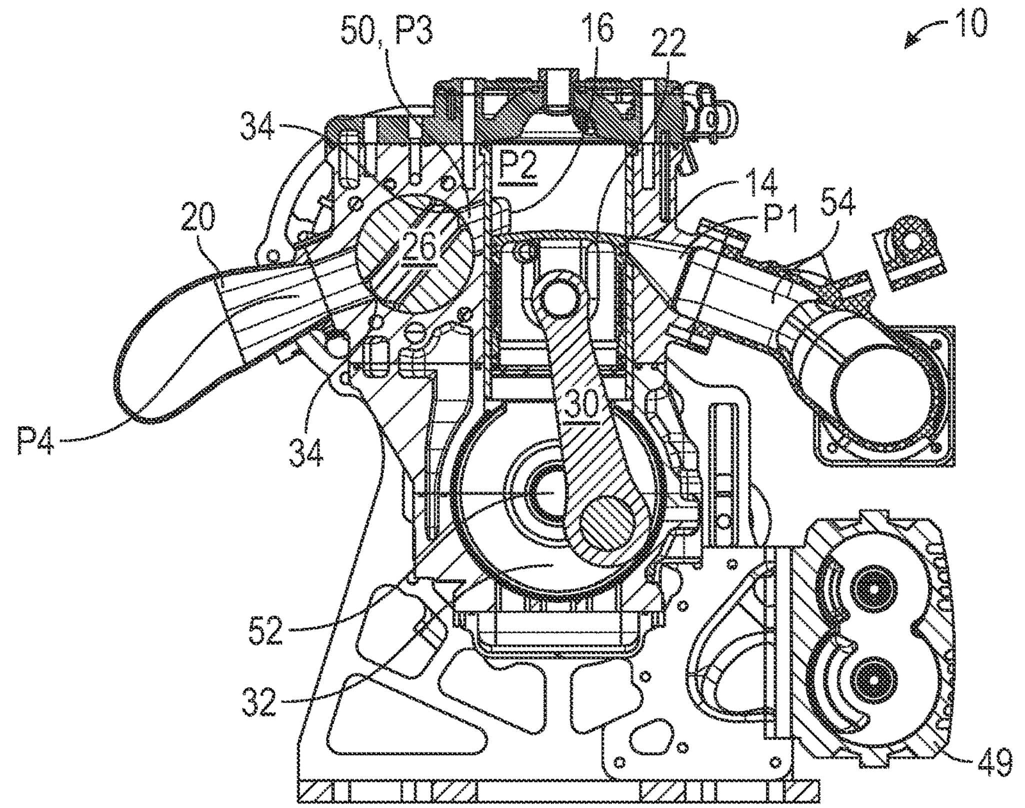
FIG. 16F is a is a schematic cross-sectional view of the example engine architecture of the present disclosure taken along line A-A in FIG. 5, showing the intake close event in relation to crankshaft positioning within the engine in the over-expansion cycle control scheme.
Figure 16G:
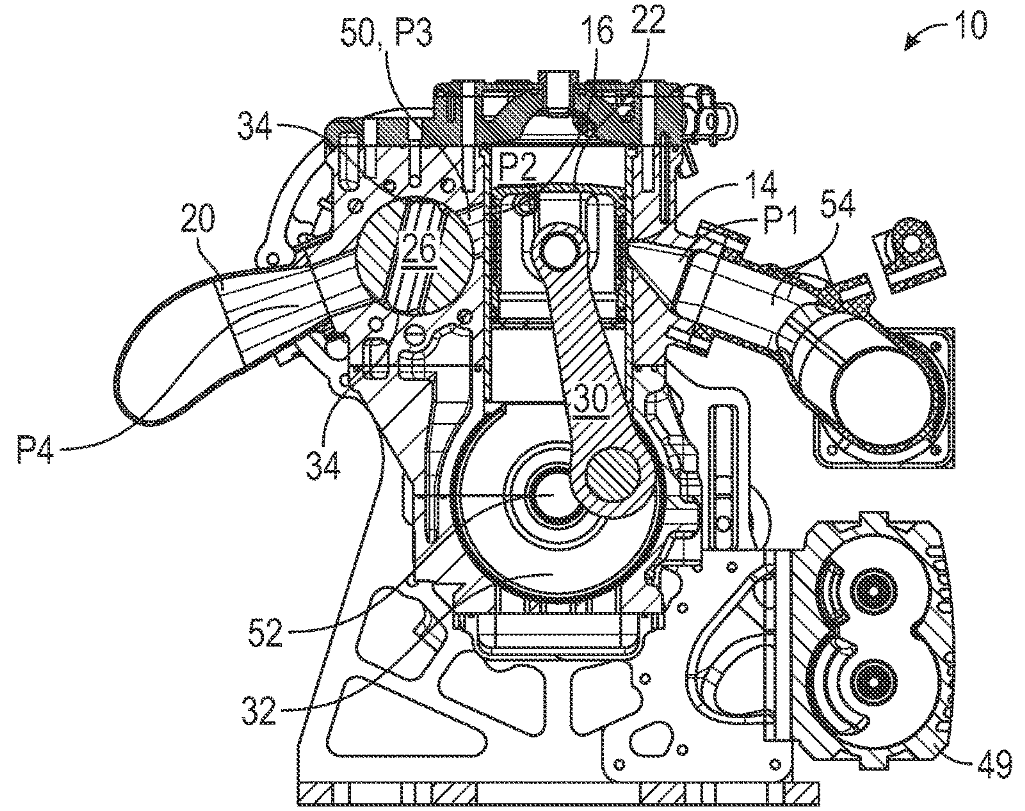
FIG. 16G is a schematic cross-sectional view of the example engine architecture of the present disclosure taken along line A-A in FIG. 5, showing the compression cycle of the engine in the over-expansion cycle control scheme.
Figure 16H:
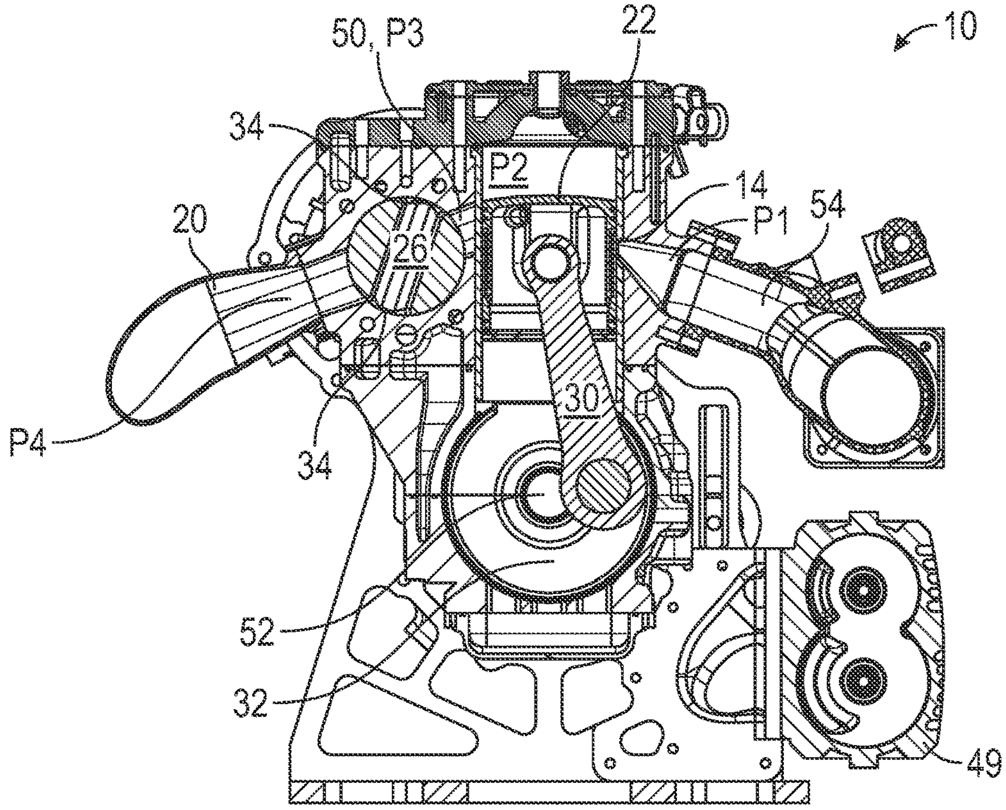
FIG. 16H is a schematic cross-sectional view of the example engine architecture of the present disclosure taken along line A-A in FIG. 5, showing the exhaust close event in relation to crankshaft positioning within the engine in the over-expansion cycle control scheme.
Figure 16I:
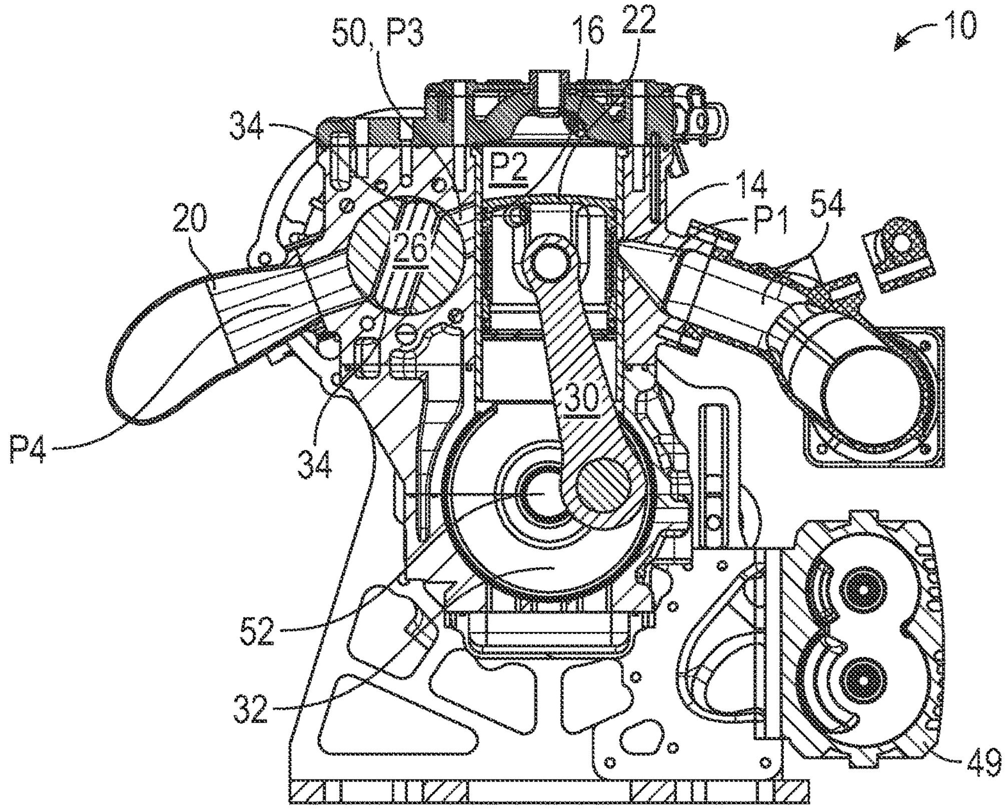
FIG. 16I is a schematic cross-sectional view of the example engine architecture of the present disclosure taken along line A-A in FIG. 5, showing the injection cycle of the engine in the over-expansion cycle control scheme.
Figure 16J:
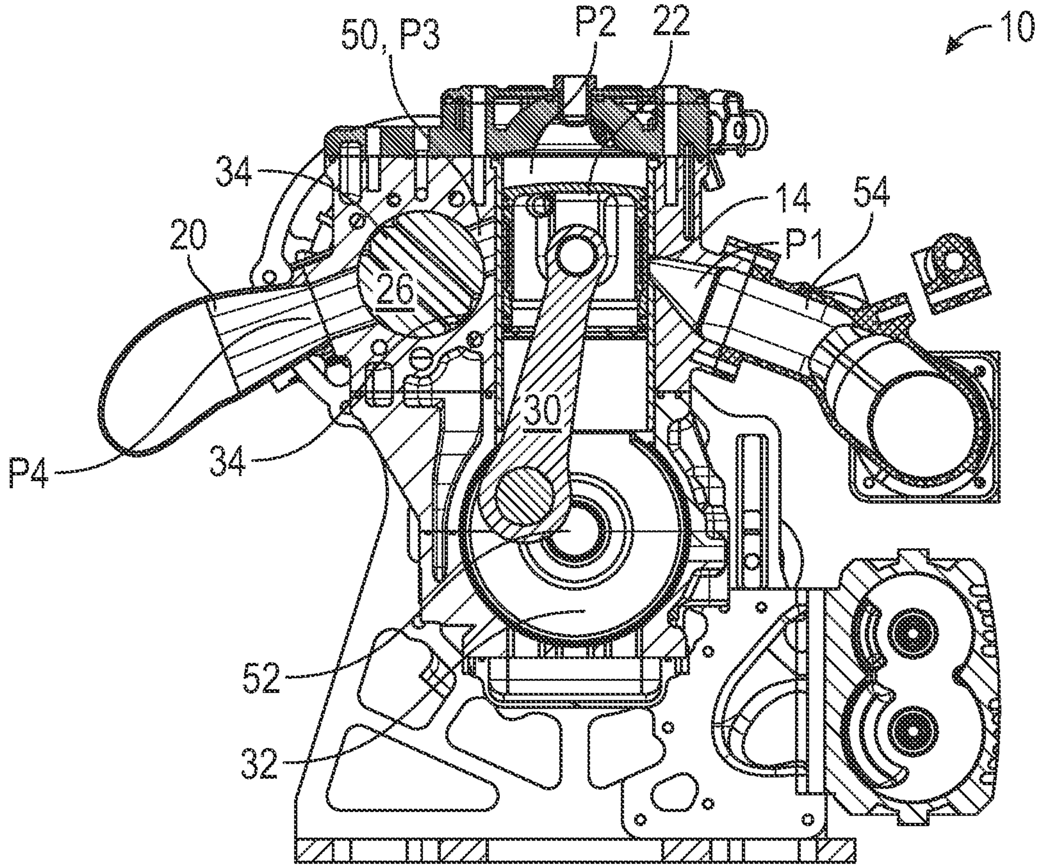
FIG. 16J is a schematic cross-sectional view of the example engine architecture of the present disclosure taken along line A-A in FIG. 5, showing the power cycle of the engine in the over-expansion control scheme.

Alternatively, as detailed in FIGS. 15-16J, the engine system 10 of the present disclosure may operate via a six-stage over-expansion cycle process or control scheme 200, per revolution of the crankshaft 52, (illustrated throughout FIGS. 16A-16J) thereby utilizing the exhaust valve 26 to force an asymmetry in exhaust timing opposite of the power cycle control scheme 100 to provide for improved thermal efficiencies of the engine system 10. In the over-expansion control scheme, the rotary exhaust valve 26 is timed to lengthen the expansion stroke of the piston 22. Said another way, the compression stroke of the piston 22 is much shorter than the power or expansion stroke of the piston 22 when the engine system 10 is operating in the over-expansion cycle control scheme.

First, in the over-expansion cycle control scheme 200, as illustrated in FIGS. 15 and 16A, the exhaust cycle is shown with respect to crankshaft 52 positioning. The exhaust cycle initially begins when the piston 22 begins a downward motion along the bore axis B and exposes the exhaust port 16. Generally, the exhaust cycle extends for a duration that is defined from a time at which the crankshaft position sensor 62 indicates that the crankshaft position angle is about 75 degrees to a time at which the crankshaft position sensor 62 indicates that the crankshaft position angle is about 285 degrees.

At the initiation of the exhaust cycle in the over-expansion control scheme, the intake port 14 is closed as it remains covered by the piston 22, but the exhaust port 16 is opened (event 201 in FIG. 15) as the piston 22 has moved vertically downward of the fixed location of the exhaust port 16. Initially, during the exhaust cycle, the valve void 34 is misaligned with the exhaust port 16, such that exhaust gas may not flow from the cylinder bore 18 to the exhaust gas pipe 20 via the exhaust port 16 and valve void 34. Said another way, the exhaust gas port 16 is opened (at event 201) during the exhaust cycle when the crankshaft position sensor 62 indicates that the crankshaft position angle is about 80 degrees after top dead center (ATDC).

Second, as illustrated in FIGS. 15 and 16B, still during the exhaust cycle, the exhaust valve 26 opens (at event 202 in FIG. 15), i.e., the valve void 34 comes into alignment with the open exhaust port 16. In the over-expansion control scheme 200, the valve void 34 is aligned with the exhaust gas port 16 as late as possible in the time domain (at event 202). Said another way, the exhaust valve 26 is opened (at event 202) during the exhaust cycle when the crankshaft position sensor 62 indicates that the crankshaft position angle is from about 80 degrees after top dead center (ATDC) to about 110 degrees after top dead center (ATDC). In one embodiment, the exhaust valve 26 is opened (at event 202) during the exhaust cycle when the crankshaft position sensor 62 indicates that the crankshaft position angle is about 93 degrees after top dead center (ATDC). As illustrated in FIGS. 15 and 16C, once the crankshaft position angle reaches about 113 degrees the intake port 14 opens (at event 203 in FIG. 15).

Third, as illustrated in FIGS. 16C-16D the cylinder flushing cycle of the engine system 10 is shown with respect to crankshaft 52 positioning. The cylinder flushing cycle begins when the intake port 14 is fully opened or uncovered by the piston 22 (event 203 in FIG. 15). During the cylinder flushing cycle, the exhaust port 16 remains open (uncovered by the piston 22) and the exhaust valve 26 also remains open. Said another way, the intake port 14 is opened (at event 203) during the cylinder flushing cycle when the crankshaft position sensor 62 indicates that the crankshaft position angle is about 113 degrees after top dead center (ATDC), and the cylinder flushing cycle extends for a duration that is defined from a time at which the crankshaft position sensor 62 indicates that the crankshaft position angle is about 113 degrees to a time at which the crankshaft position sensor 62 indicates that the crankshaft position angle is from about 65 degrees after bottom dead center (ABDC).

Fourth, as illustrated in FIGS. 15 and 16E, the cylinder charging cycle of the engine system 10 is shown with respect to crankshaft 52 positioning. In the cylinder charging cycle of the over-expansion controls scheme, the intake port 14 remains open (uncovered by the piston 22), the exhaust port 16 remains uncovered by the piston 22, and the valve void 34 is at least partially aligned with the exhaust port 16 but is starting to close, namely, the valve void 34 is only partially aligned with the exhaust port 16, such that a restricted amount of exhaust gas may move from the cylinder bore 18 to the exhaust gas pipe 20 via the stub port 50. As such, the exhaust port 16 and intake port 14 remain open at the same time during a phased duration, wherein additional incoming air is still allowed to enter the cylinder bore 18 via the intake port 14, while warm post combustion air, not yet fully expelled from the exhaust port remains in the cylinder bore, and as such cool air from the intake port may mix with warm post combustion air, not yet expelled from the exhaust port, creating greater thermal efficiency in the engine system, i.e., reducing the work required for combustion in the upcoming compression and power cycles.

The intake port 14 closes at event 204 in FIG. 15, as illustrated in FIG. 16F. The cylinder charging phase ends when the piston 22 fully covers the intake port 14 as the piston 22 moves upward along the bore axis B. As indicated, at event 204 in FIG. 15 the intake port 14 closes, when the crankshaft position sensor 62 indicates that the crankshaft position angle is about 65 degrees after bottom dead center (ABDC). The exhaust valve 26 continues to remain at least partially open at the time the intake port 14 closes, with the exhaust port 16 still uncovered by the piston 22.

Fifth, as illustrated in FIGS. 15 and 16G-16H, the compression cycle of the engine system 10 is shown with respect to crankshaft 52 positioning. The compression cycle begins when the piston 22 continues to move upward along bore axis B, to compress the gas in the cylinder bore 18 (engine combustion chamber) and partially or fully seals the exhaust port 16. Said another way, the intake port 14 is closed (event 204), when the crank shaft position sensor 62 indicates that the crank shaft position angle is about 65 degrees after bottom dead center (ABDC) and the exhaust port 16 is closed (at event 205), when the crank shaft position sensor 62 indicates that the crank shaft position angle is about 80 degrees before top dead center (BTDC), and the compression cycle extends for a duration that is defined from a time at which the crankshaft position sensor 62 indicates that the crankshaft position angle is about 80 degrees before top dead center (BTDC) to a time at which the crankshaft position sensor 62 indicates that the crankshaft position angle is about 20 degrees before top dead center (BTDC). At the conclusion of the duration, ignition occurs.

As illustrated in FIGS. 15 and 16I, the injection cycle of the engine system 10 is shown with respect to crankshaft 52 positioning. The injection cycle takes place during one of the cylinder charging cycle (port injection) or the compression cycle (direct injection). During an injection cycle of the engine system 10, an air and fuel mixture is injected into the cylinder bore 18 via at least one fuel injector 80. Each of the intake port 14 and the exhaust port 16 remain open (uncovered by the piston). The injection cycle is not fixed in time or to a particular crankshaft 52 positioning, but rather floating and may be dependent upon the engine design and injector 80 placement, as well as calibrated based on the speed and load of the engine. As indicated hereinabove, engines equipped with the injector 80 located in the intake port 14 will have the injection cycle timed during the cylinder charging cycle and can occur between when the intake port 14 opens (event 203) and when the intake port 14 closes (event 204), whereas engines equipped with the injector 80 located in the combustion chamber (direct injection) may have the injection cycle occur either during one of the cylinder charging cycle, the compression cycle, or during both the cylinder charging cycle and the compression cycle, and can be timed between when the exhaust port 16 closes (event 205) and prior to ignition.

Sixth, as illustrated in FIGS. 15 and 16J, the power cycle of the engine system 10 is shown with respect to crankshaft 52 positioning. The power cycle occurs immediately after ignition occurs and as the piston 22 starts moving downward along the bore axis B. During a power cycle of the engine system 10, each of the intake port 14 and the exhaust port 16 are closed and sealed by the piston 22. The power cycle ends as soon as the piston 22 moves far enough downward along the bore axis B to uncover the exhaust port 16, thereby beginning the exhaust cycle at event 201 in FIG. 15.

Fundamentally, the engine system 10 of the present disclosure utilizes an exhaust valve assembly 24. which allows for control of outgoing exhaust gas, and phased timing of the opening and closing the exhaust port 16. Additionally, the timing and speed of the rotary exhaust valve 26 may be varied relative to crankshaft timing, by a valve phasing assembly 28, at various engine speeds and loads, in order to control or affect the engine operation, including its horsepower, fuel efficiency, thermal efficiency, and emissions toxicity.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

Benefits, other advantages, and solutions to problems, and any element or elements that may cause any benefit, advantage, or solution to occur or become more pronounced, however, are not to be construed as critical, required, or essential features or elements of any or all of the claims, unless such benefits, advantages, solutions, or elements are expressly stated in such claims.

What is claimed is:

1. An engine system comprising:

an air pump;

an engine crankshaft disposed on a crankshaft axis and rotatable about the crankshaft axis in a predetermined direction at a first speed;

a crankshaft position sensor in fluid communication with the engine crankshaft;

a cylinder having a cylinder sidewall, the cylinder sidewall defining a cylinder bore having a bore axis, and wherein the cylinder sidewall further defines an intake port and an exhaust port disposed laterally opposite the intake port;

an intake manifold disposed between the air pump and the intake port;

a piston assembly operatively connected to the engine crankshaft, the piston assembly comprising a piston disposed within the cylinder bore and moveable along the bore axis, the piston being operable to cyclically seal and open the intake port and the exhaust port as the piston moves along the bore axis;

an exhaust assembly comprising:

at least one exhaust pipe; and an exhaust valve assembly positioned between the exhaust port and the at least one exhaust pipe, wherein the exhaust valve assembly is configured to selectively close the exhaust port irrespective of a position of the piston along the bore axis, the exhaust valve assembly including:

a rotary exhaust valve having a valve body disposed on a valve axis and rotatable about the valve axis in the predetermined direction, wherein (a) the valve body defines a first valve void therethrough having a first void center, (b) the crankshaft axis is spaced apart from and parallel to the valve axis, and (c) the rotary exhaust valve is configured to rotate about the valve axis in the predetermined direction at a second speed, the second speed being 50% of the first speed;

a valve phasing assembly operatively coupled to the rotary exhaust valve, wherein the valve phasing assembly is configured to adjust a position of the rotary exhaust valve relative to a position of the engine crankshaft; and a rotary exhaust valve position sensor in fluid communication with the rotary exhaust valve;

a stub port having a port sidewall defining a port void, the first-stub port extending from a first end disposed at the exhaust port and a second end disposed at the rotary exhaust valve; and an engine control unit in fluid communication with each of the crankshaft position sensor, the rotary exhaust valve position sensor, and the valve phasing assembly, the engine control unit having a processor and a memory on which is a set of recorded instructions, wherein executing the recorded instructions causes the processor to:

receive a continuous crankshaft position output from the crankshaft position sensor and receive a continuous rotary exhaust valve position output from the rotary exhaust valve position sensor;

calculate the first speed of the engine crankshaft, via the engine control unit, based on the continuous crankshaft position output and calculate the second speed of the rotary exhaust valve, via the engine control unit, based on the continuous rotary valve position output;

compare the first speed and the second speed; and transmit a timing signal to the valve phasing assembly, such that the valve phasing assembly adjusts the second speed of the rotary exhaust valve, such that the second speed is equal to 50% of the evaluated first speed.

2. The engine system of claim 1 wherein the air pump is one of a supercharger, a turbocharger, or a piston pump.

3. The engine system of claim 2 further comprising a bypass valve disposed along the intake manifold between the air pump and the intake port.

4. The engine system of claim 3 further comprising at least one fuel injector disposed along the intake manifold closer to the intake port than the bypass valve, wherein the at least one fuel injector is configured to injects fuel into the cylinder bore at an injection angle of 15 degrees.

5. The engine system of claim 1 wherein the cylinder is a first cylinder, the cylinder sidewall is a first cylinder sidewall, the cylinder bore is a first cylinder bore, the intake port is a first intake port, and the exhaust port is a first exhaust port, the engine system further comprising:

a second cylinder having a second cylinder sidewall, the second cylinder sidewall defining a second cylinder bore having a second bore axis, and wherein the second cylinder sidewall further defines second intake port and second exhaust port disposed laterally opposite the second intake port; and a second piston assembly operatively connected to the engine crankshaft, the second piston assembly comprising a second piston disposed within the second cylinder bore and moveable along the second bore axis, the second piston assembly being operable to cyclically seal and open the second intake port and the second exhaust port as the second piston moves along the second bore axis.

6. The engine system of claim 5 wherein the rotary exhaust valve is a first rotary exhaust valve, the valve void is a first valve void, and the exhaust valve assembly further comprises a second rotary exhaust valve having a second valve body disposed on and rotatable about the valve axis in the predetermined direction, wherein the second valve body defines a second valve void therethrough having a second void center, wherein the second rotary exhaust valve is disposed on the valve axis and positioned laterally adjacent to the first rotary exhaust valve; and a second stub port having a second port sidewall defining a second port void, the second stub port extending from a first end disposed at the second exhaust port and a second end disposed at the second rotary exhaust valve.

7. The engine system of claim 6 wherein the first rotary exhaust valve is symmetrical and the second rotary exhaust valve is symmetrical.

8. The engine system of claim 7 wherein the second valve void is positioned on the valve axis relative to the first valve void at a rotation of from ninety degrees to one-hundred and twenty degrees.

9. The engine system of claim 8 wherein the engine system is an inline two-cylinder engine system and the second valve void is positioned on the valve axis relative to the first valve void at a rotation of ninety (90) degrees, such that a first void plane running through the first void center of the first valve void is orthogonal to a second void plane running through the second void center.

10. The engine system of claim 9 further comprising:

a first plurality of support bearings disposed proximate a first end of the first rotary exhaust valve;

a first plurality of seal rings disposed between the first plurality of support bearings and the first end of the first rotary exhaust valve;

a second plurality of seal rings disposed proximate a second end of the first rotary exhaust valve;

a third plurality of seal rings disposed proximate a first end of the second rotary exhaust valve;

a second plurality of support bearings disposed between the second plurality of seal rings and the third plurality of seal rings;

a third plurality of support bearings disposed proximate the second end of the second rotary exhaust valve; and a fourth plurality of seal rings disposed between the second end of the second rotary exhaust valve and the third plurality of support bearings.

11. A method of operating an internal combustion engine system in a power cycle control scheme, the method comprising the steps of:

providing an internal combustion engine system comprising:

an engine crankshaft disposed on a crankshaft axis and rotatable about the crankshaft axis in a predetermined direction;

a crankshaft position sensor in fluid communication with the engine crankshaft;

at least one cylinder having a cylinder sidewall, the cylinder sidewall defining a cylinder bore having a bore axis, and wherein the cylinder sidewall further defines an intake port and an exhaust port disposed laterally opposite the intake port;

a piston assembly operatively connected to the engine crankshaft, the piston assembly comprising a piston disposed within the cylinder bore and moveable along the bore axis, the piston being operable to cyclically seal and open the intake port and the exhaust port as the piston moves along the bore axis;

an exhaust assembly comprising:

at least one exhaust pipe;

an exhaust valve assembly positioned between the exhaust port and the at least one exhaust pipe, wherein the exhaust valve assembly is configured to selectively close the exhaust port irrespective of a position of the piston along the bore axis, the exhaust valve assembly comprising a rotary exhaust valve having a valve body that defines a valve void, wherein the valve body is disposed on a valve axis and rotatable about the valve axis in the predetermined direction; and a valve phasing assembly operatively coupled to the rotary exhaust valve, wherein the valve phasing assembly is configured to adjust a position of the rotary exhaust valve and the valve void relative to a position of the engine crankshaft; and an engine control unit in fluid communication with each of the crankshaft position sensor, a rotary exhaust valve position sensor, and the valve phasing assembly, the engine control unit having a processor and a memory on which is a set of recorded instructions;

opening the exhaust port;

opening the intake port;

closing the exhaust port via a misalignment between the valve void and the exhaust port, wherein closing the exhaust port further includes:

evaluating the crankshaft position with the crankshaft position sensor; and signaling the valve phasing assembly, via the engine control unit, to rotate the rotary exhaust valve such that the valve void is fully misaligned with the exhaust port thereby closing the exhaust port, when the crankshaft position sensor indicates that a crankshaft position angle is from 120 degrees after top dead center (ATDC) to 50 degrees after bottom dead center (ABDC); and closing the intake port.

12. The method of operating an internal combustion engine system of claim 11 wherein opening the exhaust port further comprises:

evaluating the crankshaft position with the crankshaft position sensor; and signaling the valve phasing assembly, via the engine control unit, to rotate the rotary exhaust valve such that the valve void is fully aligned with the exhaust port, when the crankshaft position sensor indicates that the crankshaft position angle is about 80 degrees after top dead center (ATDC).

13. The method of operating an internal combustion engine system of claim 12 wherein closing the intake port further comprises:

evaluating the crankshaft position with the crankshaft position sensor; and closing the intake port further comprises closing the intake port when the crankshaft position sensor indicates that the crankshaft position angle is 65 degrees after bottom dead center (ABDC).

14. The method of operating an internal combustion engine system of claim 12 wherein opening the intake port further comprises:

evaluating the crankshaft position with the crankshaft position sensor; and opening the intake port when the crankshaft position sensor indicates that the crankshaft position angle is 110 degrees after top dead center (ATDC).

15. The method of operating an internal combustion engine system of claim 14 wherein the engine system further comprises a rotary exhaust valve position sensor in fluid communication with the rotary exhaust valve, and wherein the method further comprises:

receiving a a continuous rotary exhaust valve position output from the rotary exhaust valve position sensor;

calculating a first rotational speed of the engine crankshaft in the predetermined direction, via the engine control unit, based on the evaluated crankshaft position output;

calculating a second rotational speed of the rotary exhaust valve in the predetermined direction, via the engine control unit, based on the continuous rotary valve position output;

comparing the first rotational speed and the second rotational speed; and transmitting a timing signal from the engine control unit to the valve phasing assembly, such that the valve phasing assembly adjusts the second rotational speed of the rotary exhaust valve, such that the second rotational speed is equal to 50% of the evaluated first rotational speed.

16. A method of operating an internal combustion engine system in an over-expansion cycle control scheme, the method comprising the steps of:

providing an internal combustion engine system comprising:

an engine crankshaft disposed on a crankshaft axis and rotatable about the crankshaft axis in a predetermined direction;

a crankshaft position sensor in fluid communication with the engine crankshaft;

at least one cylinder having a cylinder sidewall, the cylinder sidewall defining a cylinder bore having a bore axis, and wherein the cylinder sidewall further defines an intake port and an exhaust port disposed laterally opposite the intake port;

a piston assembly operatively connected to the engine crankshaft, the piston assembly comprising a piston disposed within the cylinder bore and moveable along the bore axis, the piston being operable to cyclically seal and open the intake port and the exhaust port as the piston moves along the bore axis;

an exhaust assembly comprising:

at least one exhaust pipe;

an exhaust valve assembly positioned between the exhaust port and the at least one exhaust pipe, wherein the exhaust valve assembly is configured to selectively close the exhaust port irrespective of a position of the piston along the bore axis, the exhaust valve assembly comprising a rotary exhaust valve having a valve body that defines a valve void, wherein the valve body is disposed on a valve axis and rotatable about the valve axis in the predetermined direction; and a valve phasing assembly operatively coupled to the rotary exhaust valve, wherein the valve phasing assembly is configured to adjust a position of the rotary exhaust valve and the valve void relative to a position of the engine crankshaft; and an engine control unit in fluid communication with each of the crankshaft position sensor, a rotary exhaust valve position sensor, and the valve phasing assembly, the engine control unit having a processor and a memory on which is a set of recorded instructions;

opening the exhaust port via an alignment between the valve void and the exhaust port, wherein opening the exhaust port further includes evaluating the crankshaft position with the crankshaft position sensor; and signaling the valve phasing assembly, via the engine control unit, to rotate the rotary exhaust valve such that the valve void is in at least partial alignment with the exhaust port, when the crankshaft position sensor indicates that a crankshaft position angle is 90 degrees after top dead center (ATDC);

opening the intake port;

closing the intake port; and closing the exhaust port.

17. The method of operating an internal combustion engine system of claim 16 wherein the valve void is fully aligned with the exhaust port, when the crankshaft position sensor indicates that the crankshaft position angle is 180 degrees after top dead center (ATDC).

18. The method of operating an internal combustion engine system of claim 16 wherein opening the intake port further comprises:

evaluating the crankshaft position with the crankshaft position sensor; and opening the intake port when the crankshaft position sensor indicates that the crankshaft position angle is 110 degrees after top dead center (ATDC).

19. The method of operating an internal combustion engine system of claim 18 wherein closing the intake port further comprises:

evaluating the crankshaft position with the crankshaft position sensor; and closing the intake port when the crankshaft position sensor indicates that the crankshaft position angle is 65 degrees after bottom dead center (ABDC).

20. The method of operating an internal combustion engine system of claim 19 wherein closing the exhaust port further comprises:

evaluating the crankshaft position with the crankshaft position sensor; and signaling the valve phasing assembly, via the engine control unit, to rotate the rotary exhaust valve such that the valve void is fully misaligned with the exhaust port thereby closing the exhaust port when the crankshaft position sensor indicates that the crankshaft position angle is from 80 degrees before top dead center (BTDC).

* * * * *